_United States Patent Office_ 2,998,210
Patented Aug. 29, 1961

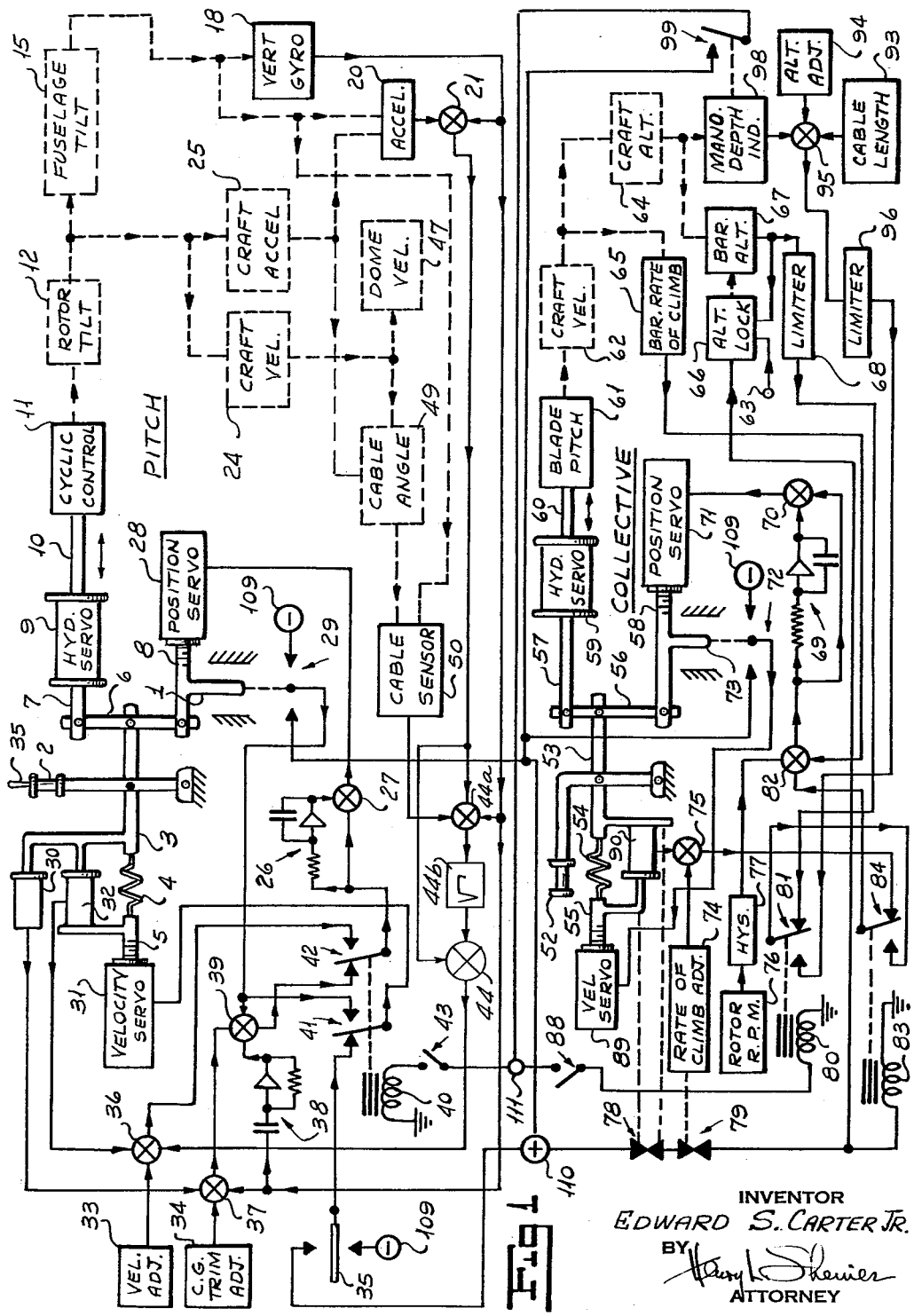

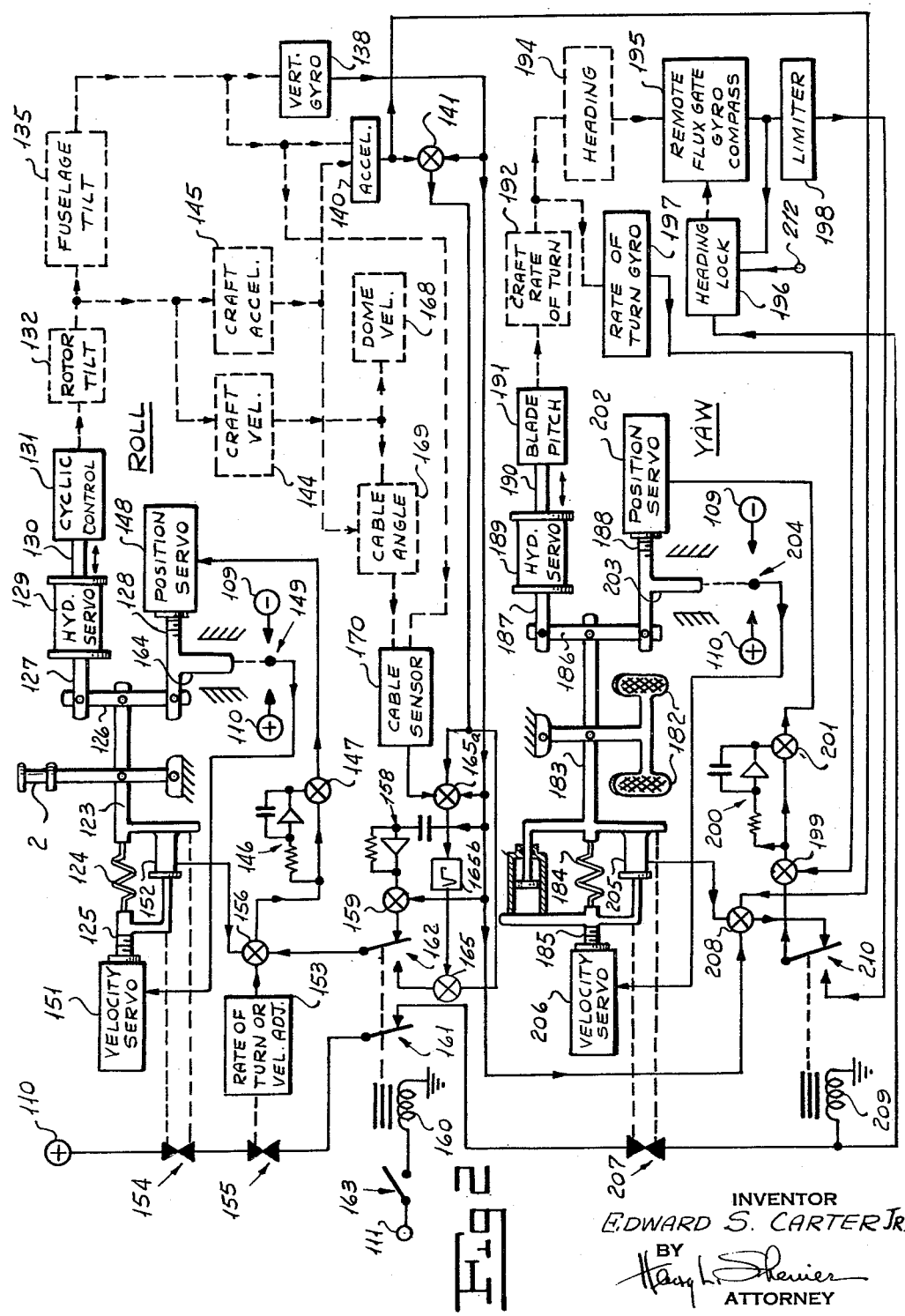

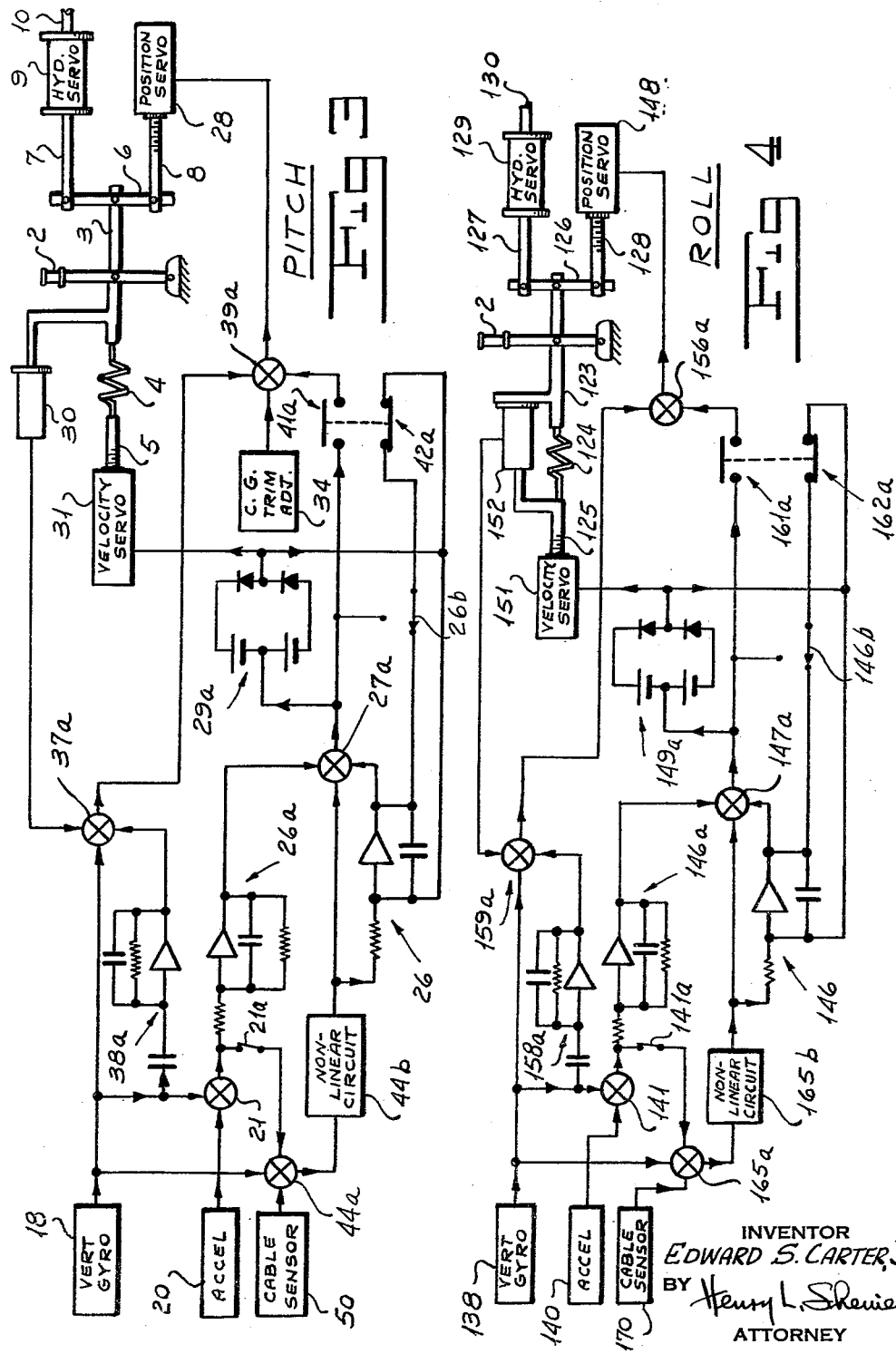

2,998,210
AUTOMATIC HOVERING CONTROL
Edward S. Carter, Jr., Fairfield, Conn., assignor to United Aircraft Corporation, East Hartford, Conn., a corporation of Delaware
Filed Oct. 3, 1958, Ser. No. 765,252
14 Claims. (Cl. 244—77)

My invention relates to an automatic hovering control system and more particularly to a hovering control system for helicopters.

In some automatic hovering control systems of the prior art, the pilot could introduce his commands only by overpowering or opposing the system or by entirely disconnecting the system. In other hovering control systems of the prior art, some pilot commands are assisted by the system; but the pilot must continually make adjustments to the system so that it will not oppose him. Consequently, automatic hovering control systems of the prior art do not cause the craft to respond to the pilot's control movements in the same manner as if the system were disconnected. In some hovering control systems of the prior art, there is always a residual steady state error owing to the fact that the gain of the system cannot be increased without causing instability. In other hovering systems of the prior art, integrators are used to reduce the steady state error to zero. These hovering systems, however, are subject to the disadvantage that if commands are imposed or initial errors exist, the integrators will run away. Especially in helicopter hovering systems of the prior art, continuous adjustments must be made to keep the system operative for variations in speed and power through a complete flight regime.

One object of my invention is to provide a hovering control system over which, at all times, the pilot has complete control and which never opposes but always assist the pilot's commands.

Another object of my invention is to provide a hovering control system in which the pilot's control movements produce craft responses similar to those which would result were the system disconnected.

A further object of my invention is to provide a hovering control system which employs integrators to reduce the steady state error to zero where, at all times, the input of each integrator is responsive to its output so that no integrator will run away.

Still another object of my invention is to provide a helicopter hovering control system operative throughout a complete flight regime from full speed to hover and from full power to auto-rotation without the necessity for continual readjustment.

A still further object of my invention is to provide a helicopter hovering control system which will maintain the craft motionless at a hover headed into the wind at a selected altitude.

Other and further objects of my invention will appear from the following description:

In general my invention contemplates comparing electrical signals from sensors responsive to pilot control movements with signals from transducers representing the natural craft motions which would result from such control movements and using the difference signal to actuate a position servomotor of limited authority which introduces small corrections independently of the pilot's controls. If the limited authority independent control exercised by the position servomotor is insufficient to reduce the difference signal to zero, then the pilot's controls are automatically repositioned until the difference signal is zero. By properly adjusting the gains of the pilot control sensors and craft motion transducers, the corrections required from the position servomotor can be reduced to a minimum and the craft response to pilot commands will be substantially the same as those resulting were the control system disconnected. To reduce the steady state error to precisely zero and achieve an exact null, I integrate the difference signal and couple to the position servomotor the sum of the difference signal and the integrated difference signal. I provide switches associated with the pilot's controls to change the craft motion transducers, the electrical signals of which are compared with those of the pilot's control sensors. Thus pilot command control movements automatically switch in and out of the system appropriate craft motion transducers, enabling a precise null and preventing the difference signal integrator from running away.

The instant invention is an improvement over the copending application of Walter Gerstenberger and Harry Jensen, Serial No. 372,265, filed August 4, 1953, for Gyro Stabilizer for Helicopters, now abandoned in favor of continuation application Serial No. 741,531, filed June 12, 1958.

The instant invention is adapted for use with the Flight Control System shown and described in my copending application, Serial No. 765,240, filed October 3, 1958.

In the accompanying drawings which form part of the instant specification and which are to be read in conjunction therewith and in which like reference numerals are used to indicate like parts in the various views:

FIGURE 1 is a schematic view showing a simplified form of the pitch and collective channels of my automatic hovering control system.

FIGURE 2 is a schematic view showing a simplified form of the roll and yaw channels of my automatic hovering control system.

FIGURE 3 is a fragmentary schematic view showing a preferred form of the pitch channel of my hovering control.

FIGURE 4 is a fragmentary schematic view showing a preferred form of the roll channel of my hovering control.

Referring more particularly now to the pitch channel of FIGURE 1, the pilot's cyclic control stick 2 when moved fore and aft controls the pitch of the craft. The cyclic stick 2 is pivoted at one end in the frame of the craft and is journaled at an intermediate point to link 3. Link 3 is journaled to an intermediate point of a multiplying linkage 6. One end of linkage 6 is journaled to the input shaft 7 of an hydraulic position servomotor 9, the output shaft 10 of which is connected to the cyclic swash plate pitch control 11. The other end of linkage 6 is connected to the output shaft 8 of an electrical position servomotor 28. A depending leg 1 of shaft 8 is adapted to act as a limit stop, such that the output shaft 8 of position servo 28 can move only between predetermined limits. Link 3 is connected by means of a pilot's feel centering spring 4 to the output shaft 5 of an integrating or velocity servomotor 31. The case of a transducer 32 is connected to velocity servo output shaft 5; and the input shaft of position transducer 32 is connected to link 3. Position transducer 32 provides an electric output signal proportional to the relative motion between shaft 5 and link 3 and hence proportional to the tension or compression of the pilot's feel centering spring 4. The case of a transducer 30 is attached to the frame of the aircraft; and the input shaft of transducer 30 is connected to link 3. Transducer 30 provides an electric signal representing the absolute position of link 3 and hence of the pilot's pitch cyclic control stick 2. Movement of the pitch cyclic control 11 causes a rotor tilt 12 in pitch such that the plane of the main rotor 12 tends to align itself with the plane of the swash plate cyclic control 11. The main rotor drive shaft, which is attached to the fuselage, tends to align itself with the resultant lift vector; and hence fuselage tilt 15 is responsive to rotor tilt 12. A pendulous vertical gyroscope gravitationally erected is provided with a pitch pickoff 18 responsive to the fuselage tilt 15 relative to the horizon. A step function in rotor tilt 12 relative to the horizon will product an immediate craft acceleration 25, which will decay exponentially to zero and will also produce a delayed response or exponential change in craft airspeed 24 to a new steady state value. Because of the damping associated with the horizontal flow of air through a rotor tilted relative to the horizon, there is always a certain craft airspeed 24 associated with a certain rotor tilt 12 relative to the horizon; and as the craft velocity 24 approaches this value, the craft acceleration 25 approaches zero. An accelerometer 20 mounted on the fuselage of the craft is responsive not only to craft acceleration fore and aft 25 but also to fuselage tilt 15 relative to the horizon. Accelerometer 20 may be of any type known to the art such as disclosed in Patent No. 2,888,256 issued on an application filed April 11, 1951. Accelerometer 20 is mounted so that its mass element moves along the longitudinal axis of the fuselage. Accelerometer 20 thus provides an electrical output signal proportional to a combination of horizontal fore and aft craft acceleration 25 and fuselage tilt 15 about the pitch axis relative to the horizon. My hovering control is adapted to maintain a helicopter motionless over a sonar dome dipped in the ocean. The sonar dome detects the presence of submarines in a manner well known to those skilled in the art. However any weighted object having a specific gravity greater than seawater would serve equally well, as, for example, a lead weight. The weighted dome to be dipped in the water is suspended from the craft's fuselage by a cable. Ultimately the dome velocity through the water must equal the craft's ground speed; and hence dome velocity 47 is shown responsive to craft velocity 24. The cable angle 49 relative to the vertical is proportional to the square of dome velocity 47 because, for the large Reynolds' numbers involved, water drag forces vary as the square of the speed. An analysis of a bob, suspended from a cable, and moving in such a fluid as water will yield the equations for a simple pendulum with non-linear square-law damping. A cable sensor 50 mounted on the craft's fuselage is responsive not only to cable angle 49 relative to the vertical but also to fuselage tilt 15 relative to the horizon and further to longitudinal craft acceleration 25. Accordingly I employ the pitch output 18 of the vertical gyro to provide a signal which compensates for the error introduced into cable sensor 50 when there is a fuselage tilt in pitch 15 relative to the true horizontal. The output of cable sensor 50 is combined with the pitch output 18 of the gyro horizon in an electrical network 44a, the gains being such that the output of network 44a is independent of fuselage tilt 15 relative to the horizon. It will be appreciated that if the cable sensor 50 were mounted on a stabilized platform, rather than on the fuselage, then its output signal would be independent of fuselage tilt 15. I employ the pitch output 18 of the vertical gyro to provide a signal which compensates for the error introduced into accelerometer 20 when there is a pitch fuselage tilt 15 relative to the horizon. The output signals of the accelerometer 20 and vertical gyro 18 are combined in a network 21 such that the output of network 21 is an electrical signal proportional only to craft acceleration 25 and independent of fuselage tilt 12 relative to the horizon. It will be appreciated that if accelerometer 20 is mounted on the stable platform provided by the vertical gyro 18, rather than on the fuselage, then its output signal will directly represent the desired acceleration in the horizontal plane independent of fuselage tilt. However, I have shown the cable sensor 50 and the accelerometer 20 to be mounted on the fuselage. Hence I employ the pitch output 18 of the vertical gyro to compensate each of these devices for the error introduced by a fuselage tilt 15 in pitch relative to the horizon.

The output of network 21 is also impressed on electrical network 44a, the gain being such that the output of network 44a is independent of longitudinal craft acceleration 25. As previously indicated, for a steady state craft velocity 24, where horizontal acceleration 25 is zero, dome velocity 47 equals craft's velocity 24 and cable angle 49 is proportional to the square of dome velocity 47. If craft acceleration 25 now changes from zero, the cable angle 49 must vary a proportional amount to accelerate the dome. I introduce the true longitudinal craft acceleration signal from network 21 into network 44a to compensate for the error introduced into cable sensor 50 when there is a longitudinal craft acceleration 25. Thus the output of network 44a is independent both of fuselage tilt 15 and of craft acceleration 25 by virtue of the error compensating signals from vertical gyro 18 and accelerometer network 21, respectively. Hence the output of network 44a varies solely as the square of craft velocitiy 25. The output of network 44a is impressed upon a square-root circuit 44b. The output signal of square-root circuit 44b accordingly varies linearly with craft velocity 24. The output of circuit 44b is combined with the output of network 21 in a network 44 to provide system damping. The outputs of transducer 32 and electrical network 44 are combined in an electrical network 36 with the output voltage of a velocity adjustment potentiometer 33. The outputs of the vertical gyro 18 and transducer 30 are combined in an electrical network 37 with the output voltage of a center of gravity trim adjustment potentiometer 34. The depending limit stop leg 1 of position servo 28 is connected to the movable contact of a single-pole double-throw switch indicated generally by the reference numeral 29. One fixed contact of switch 29 is connected to a source of negative voltage 109. The other fixed contact of switch 29 is connected to a source of positive voltage 110. The fixed contacts of switch 29 are so positioned relative to the limit stops that the movable contact thereof will engage one of the two fixed contacts before the depending leg 1 reaches either limit stop. Mounted on top of the cyclic control stick 2 is the movable spring-centered armature 35 of a single-pole double-throw beeper switch. Spring-centered armature 35 may be moved into engagement with one fixed contact, which is connected to the source of positive potential 110, or into the engagement with the other fixed contact, which is connected to the source of negative potential 109. For purposes of clarity the electrical connections to armature 35 are shown removed from its physical location on top of the cyclic stick 2. A terminal 111 is connected through a switch indicated generally by the reference numeral 43 to one terminal of a relay actuating winding 40, the other terminal of which is grounded. Relay winding 40 controls the armatures of single-pole double-throw relay switches indicated generally by the reference numerals 41 and 42. The contacts of relay switch 41 are connected respectively to spring-centered armature 35 and to the movable contact of switch 29. The output of vertical gyro 18 is connected to the input of a differentiating circuit indicated generally by the reference numeral 38 and comprising a high-gain chopper-stabilized direct-current amplifier having an input capacitor and a feedback resistor. A network 39 combines the output of differentiating circuit 38 and the output of network 37 with the signal at the movable contact of switch 29. The contacts of relay switch 42 are connected respectively to the output of network 39 and the output of network 36. The armature of relay switch 41 is connected to the integrating velocity servo 31. When relay actuating winding 40 is not energized, the armatures of relay switches 41 and 42 normally engage those contacts connected respectively to spring-centered armature 35 and to the output of network 39; and when relay winding 40 is energized, the armatures of switches 41 and 42 are drawn into engagement with those contacts connected respectively to the movable contact of switch 29 and to the output of network 36. The armature of switch 42 is connected to the input of an integrating circuit indicated generally by the reference numeral 26 and comprising a high-gain chopper-stabilized direct-current amplifier having an input resistor and a feedback capacitor. The signal appearing at the armature of switch 42 is combined with the output of integrator 26 in a network 27. The output of network 27 is connected to the position servo 28.

Referring now to the collective channel of FIGURE 1, the pilot's collective pitch lever 52 when moved up and down controls the altitude of the craft. The collective lever 52 is journaled at one end to the craft fuselage and journaled at an intermediate point to a link 53. Link 53 is journaled to an intermediate point of a multiplying linkage 56. One end of linkage 56 is journaled to the input shaft of an hydraulic position servomotor 59. The output shaft 60 of hydraulic servo 59 controls the common or collective pitch 61 of the blades of the lifting rotor or rotors. The other end of linkage 56 is connected to the output shaft 59 of a position servomotor 71. Output shaft 59 is provided with a depending leg 73, which serves as a limit stop. Link 53 is connected through a pilot's feel centering spring 54 to the output shaft 55 of an integrating velocity servomotor 89. The case of a transducer 90 is connected to link 53. The input shaft of transducer 90 is connected to the output shaft 55 of velocity servo 89. Transducer 90 provides an electrical signal proportional to the relative displacement between output shaft 55 and link 53 and hence of the tension or compression in feel centering spring 54. Depending limit stop leg 73 is connected to the movable contact of a single-pole double-throw switch indicated generally by the reference numeral 72. One fixed contact of switch 72 is connected to the source of negative potential 109 and the other fixed contact of switch 72 is connected to the source of positive potential 110. The fixed contacts of switch 72 are so positioned that the movable contact of switch 72 will engage one of the two fixed contacts before leg 73 reaches either limit stop. The movable contact of switch 72 is connected to the integrating velocity servo 89. The craft vertical velocity 62 varies with the collective blade pitch 61 because of the damping effect of air flowing through the actuator disk. For example, in hovering flight for a certain craft load it may require a blade angle of attack of 4° to support the craft for a rotor tip speed of 300 miles per hour. If the induced downwash velocity is about 20 miles per hour, then the blade pitch will be about 10° in order to obtain a 4° blade angle of attack. If the collective pitch of the rotor is increased to 11°, then the blade angle of attack will increase, accompanied by an increase in induced downwash velocity. The increased lift accelerates the craft upwardly until the rate of climb is about 300 feet per minute, where the blade angle of attack decreases to 4° because of increased velocity of air flow through the rotor. A barometric rate of climb meter 65 is responsive to the craft's vertical velocity 62. Craft altitude 64 is responsive to craft vertical velocity 62, since change in altitude is equal to the integral of vertical velocity. A barometric altimeter 67 is also responsive to craft altitude 64 in terms of the standard atmosphere. The sonar dome or weighted bob is provided with a manometric depth indicating transducer 98 calibrated, preferably, for the density of seawater. Depth indicator 98 controls a normally open switch 99. When the dome is submerged to a depth of, for example, one foot, then switch 99 will become closed. A cable length transducer 93 provides an output signal proportional to the length of cable which suspends the dome. Transducer 93 may comprise a potentiometer responsive to rotation of a drum upon which the cable is wound. Potentiometer transducer 93 should preferably be nonlinear to compensate for the reduced length of cable let out per turn of the drum as the cable length increases. The outputs of the depth indicator 98 and the cable length potentiometer 93 are combined in a network 95 with such gains that the output of network 95 is similarly altered for a one-foot change in either depth of dome submergence or cable length. The output voltage of an altitude adjustment potentiometer 94 is also introduced into network 95. The output of network 95 is connected to the input of a limiter circuit 96. The output signal of barometric altimeter 67 is connected to the input of a limiter circuit 68. The source of positive potential 110 is connected through switch 99 to the terminal 111. Terminal 111 is connected through a switch indicated generally by the reference numeral 88 to one terminal of a relay actuating winding 80, the other terminal of which is grounded. Relay winding 80 controls the armature of a single-pole double-throw relay switch indicated generally by the reference numeral 81. The outputs of limiters 68 and 96 are connected respectively to the two contacts of relay switch 81. An electrical network 75 combines the output voltage of transducer 90 with the output voltage of a rate of climb adjustment potentiometer 74. The output shaft 55 of velocity servo 89 is connected to one contact of a switch indicated generally by the reference numeral 78. Switch 78 is normally closed; but any motion by the pilot of the collective stick 52 against the feel centering spring 54 will cause switch 78 to open. The actuating member of the rate of climb adjustment potentiometer 74 is mechanically connected to one contact of a normally closed switch 79. Any motion of the rate of climb adjustment potentiometer 74 from its zero position causes switch 79 to open. The source of positive potential 110 is connected serially through switches 78 and 79 to one terminal of a relay actuating winding 83, the other terminal of which is grounded. Winding 83 controls a single-pole double-throw relay switch indicated generally by the reference numeral 84. The armature of relay switch 81 is connected to one contact of switch 84; and the output of network 75 is connected to the other contact of switch 84. The barometric altimeter 67 is provided with a locking circuit 66. As will be appreciated by those skilled in the art, the output of the barometric altimeter 67 is provided by a pickoff, one element of which is mounted on the pressure sensitive bellows and the other element of which is mounted on the case. As shown in my copending application, altitude locking circuit 66 comprises a servomotor, the output shaft of which drives the case-mounted pickoff of the barometric altimeter 67. By means of a spring centered switch, shown in my copending application, similar to the pitch beeper switch 35, the pilot may apply positive or negative voltage to a terminal 63 which is connected to a first input of locking circuit 66. The output signal of barometric altimeter 67 is connected to a second input of locking circuit 66. The ungrounded terminal of relay winding 83 is connected to a third input of altitude locking circuit 66. When relay winding 83 is energized and a signal is present at the third input of circuit 66, the altitude lock servo is rendered responsive to the first input from terminal 63 and unresponsive to the second input from altimeter 67. When winding 83 is not energized and no signal is present at the third input of circuit 66, the altitude lock servo is rendered responsive to the second input from altimeter 67 and unresponsive to the first input from terminal 63. Thus, when no signal appears at the third input of circuit 66, the altitude lock servo is forced to drive the case-mounted pickoff until the output error signal of barometric altimeter 67 is zero. When a signal is present at the third input of circuit 66, altitude error signals can be generated, since the case-mounted pickoff remains stationary, unless the pilot commands a change in altitude by switching terminal 63 to either positive or negative voltage. A tachometer 76 provides an output voltage proportional to the speed of the main rotor. The output of tachometer 76 is connected to a hysteresis circuit 77.

Hysteresis circuit 77 has the characteristic of producing no output voltage over a certain range of input voltage and then producing an output voltage proportional to input voltage in regions outside this range. The output of hysteresis circuit 77 and the voltage appearing at the armature of relay switch 84 are electrically combined in a network 82 with the output voltage of the barometric rate of climb meter 65. The output of network 82 is connected to the input of an integrator indicated generally by the reference numeral 69 and comprising a high-gain chopper-stabilized direct-current amplifier having an input resistor and a feedback capacitor. The outputs of integrator 69 and network 82 are combined in an electrical network 70, the output of which is connected to position servo 71. When relay winding 80 is not energized, the armature of relay switch 81 is normally connected to the output of barometric altimeter limiter 68. When relay winding 83 is not energized the armature of relay switch 84 is normally connected to the output of electrical network 75. When winding 80 is energized the armature of switch 81 is drawn into engagement with that contact connected to the output of limiter 96; and when winding 83 is energized the armature of switch 84 is drawn into engagement with that contact connected to the armature of switch 81.

Referring now to the roll channel of FIGURE 2, the pilot's cyclic stick 2 also, when moved left and right, controls the roll of the craft. The cyclic stick 2 is also journaled at an intermediate point to a link 123. Link 123 is journaled to an intermediate point of a multiplying linkage 126. One end of multiplying link 126 is journaled to the input shaft 127 of an hydraulic position servomotor 129. The output shaft 130 of hydraulic position servo 129 operates the swash plate roll cyclic control 131. The other end of multiplying link 126 is connected to the output shaft 128 of a position servomotor 148. Link 123 is connected through a pilot's feel centering spring 124 to the output shaft 125 of an integrating velocity servomotor 151. The case of a transducer 152 is connected to link 123; and the input shaft of transducer 152 is connected to the velocity servo output shaft 125. Thus transducer 152 provides an electrical output signal proportional to the relative motion between link 123 and output shaft 125 and hence proportional to the tension or compression in feel centering spring 124. A depending leg 164 on position servo output shaft 128 provides limit stops for the position servo 148. Depending limit stop leg 164 is connected to the movable contact of a single-pole double-throw switch indicated generally by the reference numeral 149. The fixed contacts of switch 149 are connected respectively to the source of positive potential 110 and the source of negative potential 109 and are so disposed that they will be engaged by the movable contact before leg 164 reaches a limit stop. The movable contact of switch 149 is connected to the velocity servo 151. Movements of the swash plate roll cyclic control 131 cause a resultant roll tilt in the rotor lift vector 132 until the plane of the rotor 132 approximates that of the swash plate 131. The main rotor drive shaft tends to align itself with the lift vector, and hence fuselage tilt 135 is shown responsive to the rotor tilt 132. The craft athwartship velocity 144 and the craft athwartship acceleration 145 are responsive to rotor tilt 132 in roll relative to the horizon. The rotor tilt 132 in roll relative to the horizon has an immediate effect on the craft athwartship acceleration 145. Rotor tilt 132 relative to the horizon has a delayed effect upon craft velocity 144. For the roll channel, as in the pitch channel, a step function in rotor tilt 132 will cause a craft acceleration which decays exponentially to zero and will cause a craft velocity which will rise exponentially to its steady state value. Because of the damping effect of air moving with a component normal to the plate of the rotor, as the craft acceleration 145 approaches zero, the craft velocity 144 approaches its steady state value. The pendulous, gravity-erected vertical gyroscope is also provided with a roll pickoff 138 which generates an electrical output signal proportional to the fuselage tilt in roll 135 relative to the horizon. An accelerometer 140 mounted on the fuselage provides an output signal proportional not only to left-right craft acceleration 145 but also to the fuselage tilt 135 relative to the horizon. Accelerometer 140 is mounted so that its sensitive mass element moves along the athwartship axis of the fuselage. I employ the roll output 138 of the vertical gyro to provide a signal which compensates for the error introduced into accelerometer 140 when there is a roll fuselage tilt 135 relative to the horizon. The output signals of the accelerometer 140 and the vertical gyro 138 are electrically combined in a network 141 such that the output of network 141 is proportional only to craft acceleration 145 and independent of fuselage tilt 135. Again it will be noted that if accelerometer 140 is mounted on the vertical gyro 138, then its output will represent the desired acceleration in the horizontal plane independent of fuselage tilt. Ultimately, the steady state velocity 168 of the sonar dome equals the craft left-right horizontal velocity 144. Again the cable angle 169 relative to the vertical is proportional to the square of dome velocity 168 because of water drag. A cable sensor 170, mounted on the fuselage, is responsive not only to cable angle 169 relative to the vertical but also to fuselage tilt 135 relative to the horizon and further to lateral craft acceleration 145. I employ the roll output 138 of the vertical gyro to provide a signal which compensates for the error introduced into cable sensor 170 when there is a fuselage tilt 135 in roll relative to the horizon. I employ the output of lateral accelerometer network 141 to compensate for the error introduced into cable sensor 170 where there is a lateral craft acceleration 145. The outputs of cable sensor 170, accelerometer network 141, and vertical gyro 138 are combined in a network 165a. The output of network 165a is proportional solely to the square of lateral craft velocity 144 and independent of fuselage roll tilt 135 and of craft lateral acceleration 145. The output of network 165a is impressed on a square-root circuit 165b. The output of square-root circuit 165b thus varies linearly with athwartship craft velocity 144. The linear athwartship velocity output signal of square-root circuit 165b is summed with the output of accelerometer network 141 in a network 165 to provide system damping. The outputs of network 141 and gyro 138 are introduced into network 165a with such gains that the output of network 165a is compensated for errors produced by cable sensor 170 due to fuselage tilt 135 and craft acceleration 145. It will be appreciated that if the roll cable sensor 170 is mounted on a stabilized platform it will directly yield the desired cable angle 169 relative to the vertical. However, I have shown the lateral cable sensor 170 and the lateral accelerometer 140 to be mounted on the fuselage. Hence I employ the roll output 138 of the vertical gyro to compensate each of these devices for errors caused by roll fuselage tilt 135 relative to the horizon. The roll and pitch cable sensor 170 and 50 respectively may be actuated by bails through which the cable runs as is shown by Gerstenberger et al. The output of network 141 is also impressed upon network 165 so that the output thereof also contains a damping signal proportional to craft acceleration 145 in the horizontal plane. As previously indicated, cable angle 169 is proportional to the square of dome velocity 168 only for steady state conditions where craft acceleration 145 is zero. For craft acceleration other than zero, the cable angle 169 will differ from its steady state value by an amount proportional to the acceleration. Terminal 111 is connected through a switch indicated generally by the reference numeral 163 to one terminal of relay actuating winding 160, the other terminal of which is grounded. Winding 160 controls relay switches indicated generally by the reference numerals 161 and 162. The output voltage of a rate of turn or velocity adjustment potentiometer 153 is combined with the output voltage of transducer 152 and with the signal at the armature of switch 162 in a network 156. The roll output signal of the vertical gyro 138 is connected to the input of a differentiating circuit indicated generally by the reference numeral 158 and comprising a high-gain chopper-stabilized direct-current amplifier having an input capacitor and a feedback resistor. The output voltages of the differentiating circuit 158 and the vertical gyro 138 are combined in a network 159. The contacts of relay switch 162 are connected respectively to the outputs of networks 159 and 165. The source of positive potential 110 is connected serially through a switch 154 and a switch 155 to the armature of relay switch 161. One contact of switch 154 is connected to the output shaft 125 of velocity servo 151; the other contact of switch 154 is connected to link 123. Switch 154 is normally closed; but any pilot's left-right motion of the cyclic stick 2 will cause switch 154 to open. One contact of switch 155 is mechanically connected to the actuating member of rate of turn or velocity adjustment potentiometer 153. Switch 155 is normally closed; but any motion by the pilot of potentiometer 153 from its zero position will cause switch 155 to open. The output of network 156 is connected to the input of an integrating circuit indicated generally by the reference numeral 146 and comprising a high-gain chopper-stabilized direct-current amplifier having an input resistor and a feedback capacitor. The signals appearing at the output of integrating circuit 146 and at the output of network 156 are electrically combined through a network 147, the output of which is connected to position servo 148.

Referring now to the yaw channel of FIGURE 2, the pilot's rudder pedals control 182 is journaled to the fuselage and also to a link 183. Link 183 is journaled to an intermediate point of a multiplying linkage 186. One end of multiplying link 186 is connected to the input shaft 187 of an hydraulic position servo 189. The output shaft 190 of hydraulic position servo 189 controls the pitch of the tail torque rotor 191. It will be appreciated that while I have shown a flight control system for use in helicopters having a single sustaining rotor with an anti-torque tail rotor, my system is equally adapted for use in helicopters having a plurality of lifting rotors disposed either in a tandem or a coaxial configuration. The other end of multiplying link 186 is journaled to the output shaft 188 of a position servomotor 202. Link 183 is connected through a pilot's feel centering spring 184 to the output shaft 185 of an integrating or velocity servomotor 206. An hydraulic dashpot damper 193 is also provided with its cylinder connected to velocity servo output shaft 185 and its piston connected to link 183. The output shaft 188 of position servo 202 is provided with a depending leg 203 which serves as a limit stop. Depending limit stop leg 203 is connected to the movable contact of a single-pole double-throw switch indicated generally by the reference numeral 204. The two fixed contacts of switch 204 are connected respectively to the source of positive potential 110 and to the source of negative potential 109. The fixed contacts of switch 204 are so disposed that the movable contact will engage one of the fixed contacts before depending leg 203 reaches either limit stop. The movable contact of switch 204 is connected to the velocity servo 206. The craft rate of turn 192 is responsive to tail rotor blade pitch 191 because of air damping. The craft heading 194 is responsive to the craft rate of turn 192, since change in heading is equal to the integral of rate of turn. A remote flux-gate gyro compass 195 attached to the fuselage provides an output signal representing the deviation in craft heading 194 from a desired heading. A rate of turn gyroscope 197, mounted on the fuselage, is responsive to the craft rate of turn 192. The output of the flux-gate gyro compass 195 is applied to the input of a limiter circuit 198. The case of a transducer 205 is connected to link 183; and the input of transducer 205 is connected to velocity servo output shaft 185. Transducer 205 provides an electrical output signal proportional to the resultant motion between link 185 and velocity servo output shaft 185 and hence proportional to the tension or compression in the feel centering spring 184. The outputs of the vertical gyro roll pickoff 138 and of the yaw transducer 205 and of the roll accelerometer 140 are electrically combined in a network 208. The contact of relay switch 161 is connected through a switch indicated generally by the reference numeral 207 to one terminal of a relay actuating winding 209, the other terminal of which is grounded. Relay winding 209 controls a single-pole double-throw relay switch indicated generally by the reference numeral 210. When relay winding 160 is not energized, the armature of relay switch 161 normally engages the contact thereof; and the armature of relay switch 162 normally engages that contact connected to the output of network 159. One contact of switch 207 is connected to the velocity servo output shaft 185; and the other contact of switch 207 is connected to link 183. Switch 207 is normally closed; but any motion of the rudder pedals 182, causing a tension or compression in feel centering spring 184, will cause switch 207 to open. The contacts of relay switch 210 are connected respectively to the output of network 208 and the output of limiter 198. The signal appearing at the armature of relay switch 210 is combined with the output signal of the rate of turn gyro 197 in a network 199. The output of network 199 is connected to the input of an integrating circuit indicated generally by the reference numeral 200 and comprising a high-gain copper-stabilized direct-current amplifier having an input resistor and a feedback capacitor. The signals appearing at the outputs of integrator 200 and of network 199 are electrically combined in a network 201, the output of which is connected to position servo 202. The gyro compass 195 is provided with a locking circuit 196. As will be appreciated by those skilled in the art, the remote compass 195 produces an output signal from a pickoff, one element of which is mounted on the cage of the gyro and the other element of which is mounted on the case. The heading lock circuit 196 comprises a servomotor the output shaft of which drives the case-mounted pickoff of the remote flux-gate gyro compass 195. By means of a spring-centered switch, not shown, similar to the pitch beeper switch 35, the pilot may apply positive or negative voltage to a terminal 193 which is connected to a first input of heading lock 196. The output signal of remote gyro compass 195 is connected to a second input of heading lock 196. The ungrounded terminal of relay winding 209 is connected to a third input of heading lock 196. The operation of the heading lock 196 for the yaw channel is similar to the operation of the altitude lock 66 for the collective channel. When no signal appears at the third input of heading lock circuit 196, the heading lock servo is forced to drive the case-mounted pickoff until the output error signal of gyro compass 195 is zero. When a signal is present at the third input of heading lock circuit 196, heading error signals can be generated, since the case-mounted pickoff turns with craft, unless the pilot commands a change in heading by switching terminal 193 to either positive or negative voltage.

It will be appreciated that I have shown my flight control system instrumented on a direct-current basis. Direct current is required, however, only for integrator 26 and differentiator 38 of the pitch channel, for integrator 69 and differentiator 97 of the collective channel, for integrator 146 and differentiator 158 of the roll channel, and for integrator 200 of the yaw channel. For all other components the system may, with equal advantage, be instrumented on an alternating-current basis. As will be understood by those skilled in the art, where my system is partially instrumented on an alternating-current basis, then phase-sensitive modulators and demodulators will be required at appropriate points for the differentiators and integrators. For example, in the yaw channel, if the inputs to network 199 are alternating current, then network 199 must include a phase-sensitive demodulator to convert its alternating-current output voltage into a direct-current signal of a proportional magnitude and an appropriate polarity; and if position servo 202 operates on alternating current, then network 201 must include a phase-sensitive modulator to convert its direct-current output voltage into an alternating-current signal of a proportional magnitude and an appropriate polarity. However, for purposes of clarity, I have shown my system instrumented entirely on a direct-current basis.

As shown by Gerstenberger et al., each of position servomotors 28, 71, 148, and 202 incorporates a position follow-up transducer providing a signal proportional to displacement of the servo output shaft. The servo input signal is compared with the follow-up signal; and the error voltage causes the servomotor to be driven until input and follow-up voltages correspond. Thus the servo output shaft is positioned in correspondence with the input voltage. In order to damp excessive overshoot or oscillation, each of the position servomotors also incorporates a tachometer rate generator the output signal of which is combined with the error voltage to drive the servomotor. The rate generator damping may be adjusted to slightly less than critical so that the frequency response curve exhibits a slight peak and there is a slight overshoot in response to step function inputs.

Each of velocity servomotors 31, 89, 151, and 206 may comprise a simple servomotor which rotates at a speed approximately proportional to input voltages. It is not required that there be good linearity between input voltage and speed of rotation for these integrating velocity servos. Hence there is no need to provide the tachometer rate generator feedback which would be required were linearity in velocity of importance. As will be appreciated by those skilled in the art, the integrating action afforded by a velocity servo may be achieved, with equal advantage, by instead providing a beeper or stepping-switch motor which may have an actuating frequency of, for example, one beep or step for each two-second period. As shown by Gerstenberger et al., the integrating action afforded by an electrical velocity servo may also be achieved by instead providing spring stops for the input valve of an hydraulic position servo so that the fluid flow cannot be cut off. Thus the hydraulic position servo is converted into an integrating velocity servo whose output shaft moves at a certain rate or velocity carrying the input shaft along with it.

Each of the electrical networks, such as networks 36 and 37, may comprise passive resistance combining circuits or active summing amplifier circuits where signals are to be added. Where signals are to be subtracted, then such networks may comprise differential amplifiers or may include inverting amplifiers for those inputs to be subtracted. Various circuits, well-known to the art, for performing these simple algebraic operations are found in "Electronic Analog Computers (D-C Analog Computers)" by Korn and Korn on pages 10–14, 170, 173, 178, 309, 310, and 319.

My automatic hovering control system is adapted to operate in two distinct modes, one being the stabilization mode, and the other being the hovering mode.

In operation of my control system in the stabilization mode of the pitch channel, the output voltage of transducer 30, which measures the absolute position of the pilot's cyclic stick 2 in pitch, is compared with the pitch output 18 of the vertical gyro. Thus in the stabilization mode the absolute position of the pilot's stick 2 in pitch causes a corresponding fuselage tilt 15. Because fuselage tilt 15 and rotor tilt 12 tend towards correspondence and since rotor tilt 12 relative to the horizon is proportional to air speed 24, the pitch output 18 of the vertical gyro is substantially proportional to the air speed 24 of the craft. Thus, because of the comparison of the absolute position of the pilot's cyclic stick in pitch with fuselage tilt, through components 30 and 18, the position of the cyclic stick in pitch is proportional not only to fuselage tilt but also to rotor tilt relative to the horizon and hence to the forward air speed of the craft. Assume for the moment that the craft center of gravity coincides with the main rotor drive shaft and that the air speed is zero. In such event there will be no fuselage tilt 15 relative to the horizon; and the pitch output of vertical gyro 18 will be zero. And because the air speed is zero, there will be no rotor tilt 12 relative to the horizon. The pilot's stick 2 will be neutrally positioned so that the swash plate cyclic control 11 is also substantially horizontal. The system is adjusted so that under these conditions the output of transducer 30 is zero when the position servo output shaft 8 is located such that the depending leg 1 is intermediate its limit stops. Now if, owing to changes in load, the center of gravity is shifted aft, for example, the fuselage will tilt upwardly causing a signal from the vertical gyro 18. A forward tilt of the cyclic control 11 will be required to maintain the plane of the rotor coincident with the horizon so that the air speed remains zero. This forward motion of the cyclic control 11 is produced by a movement of the position servo output shaft 8; and depending leg 1 will now approach one of the two limit stops. The center of gravity trim adjustment potentiometer 34 provides a voltage so that the depending leg 1 of the position servo may be located intermediate the limit stops under all variations of center of gravity location. With a center of gravity aft the main rotor drive shaft and the depending leg 1 positioned intermediate the limit stops in order to maintain zero air speed, the cyclic stick 2 must be moved forward. Such motion of the stick 2 will cause a signal from transducer 30. Thus the center of gravity trim adjustment potentiometer 34 must be moved from its zero position to supply an opposite polarity voltage equal to the sum of the voltages produced by the pitch pickoff 18 of the vertical gyro and by transducer 30. The center of gravity trim adjustment potentiometer 34 may be positioned either explicitly, according to the particular loading conditions which every pilot calculates for his craft, or implicitly, by causing the output of summing network 27 to become zero. In the stabilization mode relay winding 49 is not energized; and the armature of switch 42 engages that contact connected to the output of network 39. Differentiator 38 provides damping for the system. The gains of components 18 and 30 and the time-constant of differentiator 38 should be adjusted so that for a step function in absolute position of the pilot's stick 2, accompanied by a step change in the output of transducer 30 and by a step change in rotor tilt 12 and by an exponential change both in fuselage tilt 15 and in vertical gyro output 18, differentiator 38 will produce a step function decaying exponential voltage which when added to the vertical gyro output 18 will be equal and opposite to the voltage produced by transducer 30, so that the output of network 39 remains substantially zero and output shaft 8 of position servo 28 will not move. This adjustment of the time-constant of differentiator 38 produces damping slightly greater than critical so that the craft approaches the pitch attitude commanded by the absolute position of the pilot's stick 2 in a dead-beat manner with no overshoot. Since the position servo 28 for these adjustments does not move, the craft response closed loop will be substantially the same as open loop were the system disconnected. Position servo 28 is called upon to produce only the slight corrections required to maintain the commanded attitude which may be occasioned by wind gusts or other transients. It will be appreciated that the damping signal afforded by differentiator 38 might, with equal advantage, be obtained from a rate gyro sensitive to motions in the pitch plane; but since the vertical gyro 18 provides proportional signals for wide pitch changes with good linearity, the differentiation of such signal by means 38 affords a cheaper and more reliable expedient than would be the use of a rate gyro. Presumably, if the setting of the center of gravity trim adjustment potentiometer 34 is proper, the output shaft 8 of position servo 28 would remain positioned intermediate its limit stops at all air speeds and hence at any fuselage tilt 15 relative to the horizon. However, because of some nonlinearity in the gradient between the position of cyclic stick 2 and the resulting fuselage tilt 15 as indicated by the vertical gyro 18, the resulting output shaft 8 of position servo 28 will be required to move from its zero position over a complete flight regime from full speed to hover. Other nonlinearities are produced by fuselage drag and by the horizontal tail surfaces usually provided for dynamic stability in pitch. Integrator 26 causes the zero frequency gain of the system to be substantially infinite. Hence integrator 26 accommodates this slight change from the zero position of output shaft 8 over the complete speed range in the flight regime while permitting the output error signal of network 39 to be precisely zero. Position servo 28 moves an amount and in a direction according to the magnitude and polarity of the output voltage of network 27. If the output of network 27 is zero, then servo 28 returns to its zero position midway between the contacts of limit switch 29. As is described hereinbefore and as is shown by Gerstenberger et al., servo 28 incorporates a position follow-up transducer. In order for servo 28 to remain displaced from its null position, there must exist a continuing signal from network 27. If an error signal, no matter how small, is produced by network 39, the output of integrator 26 will build up; and the output of network 39 will decay to zero. Integrator 26 will thus provide the entire steady-state signal required to maintain position servo 28 displaced from its null. The pilot has two methods of changing the fuselage tilt 15 and hence the air speed of the craft. One method is to continuously hold the cyclic stick 2 in the desired position against the pilot's feel spring 4. The second method, which would be used for long range cruising, is to move the spring-centered armature 35 forward causing a signal of an appropriate polarity to be applied to the armature of switch 41 and thence to velocity servo 31 to position its output shaft 5 and hence spring 4 so that the pilot's stick 2 will remain in the desired position without the necessity for any sustained pressure. If the adjustment of the center of gravity trim potentiometer 34 is grossly incorrect, then depending leg 1 will hit a limit stop; and the system cannot reach a true null. However, adjacent a limit stop the movable contact of switch 29 engages a fixed contact, causing a voltage to be impressed on network 39 of such polarity that position servo 28 will be driven away from the limit stop. The movable contact of switch 29 will disengage the fixed contact; and position servo 28 will be driven again towards the limit stop. This action prevents integrator 26 from running away to saturation. Position servo 28 will gently oscillate at a limit stop; and the resulting controlled pitch oscillation of the craft will warn the pilot that his center of gravity trim setting is improper. If the pilot cannot set his C.G. potentiometer 34 so that a true null is achieved, then this warns him that the load may have shifted, as by cargo breaking away. It will be appreciated that, rather than applying the signal appearing at the movable contact of switch 29 to network 39, I might instead apply such signal to a servomotor which would automatically reposition C.G. trim potentiometer 34 to achieve a true null. While it is true that such construction would relieve the pilot of the necessity for manually setting the C.G. trim, there would be no warning that center of gravity limits have been approached and exceeded.

In the stabilization mode of the roll channel, the output voltage of transducer 152, which measures the relative tension or compression in centering spring 124, is compared with the roll output 138 of the vertical gyro. In the stabilization mode, relay winding 160 is not energized; and the armature of switch 162 engages that contact connected to the output of network 159. If the rate of turn adjustment 153 is at its neutral or zero position and the pilot exerts no lateral forces on the cyclic stick 2, the craft fuselage will seek and maintain a horizontal position. It will be noted that in the roll channel the absolute position of the pilot's stick 2 is not measured. At zero air speed the pilot's stick is neutrally positioned; but as the forward air speed rises from zero, a motion of the cyclic control stick 2 will be required to equalize the lift over the actuator disk so that advancing blades have a less than normal angle of attack. For air-driven rotors, such as in autogyros or in helicopters during autorotation, the use of articulated rotor blades permits of flapping to equalize the lift over the actuator disk, which causes a backwards rotor tilt as an advancing blade flaps upwardly and a retreating blade flaps downwardly. But for a powered rotor, requiring a forward tilt to maintain air speed, there is required a motion of the pilot's cyclic stick in roll from its neutral position as a function of air speed. Accordingly, the absolute position of the pilot's stick 2 in roll is not simply related to the roll fuselage tilt 135, since in order to maintain the fuselage tilt 135 at zero, the stick must be moved further and further from the neutral position as the air speed is increased. Hence for the roll channel, the output shaft 128 of position servo 148 cannot remain substantially in its zero position intermediate the limit stops. Assuming that the craft is hovering at zero air speed, if the pilot moves his stick 2 forward causing the craft to accelerate and the forward velocity to change from zero to maximum, the roll position servo 148 will be required to move from its neutral position towards one limit stop. Because the position servo 148 is only of limited authority and cannot accommodate the large changes required in roll to equalize the lift around the actuator disk, the pilot's cyclic stick 2 must be repositioned in roll. This repositioning in roll is accomplished automatically by velocity servo 31; and the pilot need not touch his control stick 2. As output shaft 128 approaches a limit stop, the movable contact of switch 149 first engages one of the two fixed contacts causing an appropriate voltage to be applied to the movable contact and energizing velocity servo 152 to drive its output shaft 125 in a direction to reposition through spring 124 the pilot's stick 2 and hence the cyclic control 131 until the position servo output shaft 128 moves away from such limit stop an amount sufficient for the movable contact of switch 149 to disengage the fixed contact thereof. Thus the pilot need make no corrections to the roll channel over a complete flight regime ranging from full speed forward to hover. There are two ways in which the pilot may command a roll fuselage tilt 135. Firstly, the pilot may maintain a pressure on the control stick 2 to produce a tension or compression in spring 124 and hence a positive or negative output of transducer 152. Secondly, the pilot may move his rate of turn adjustment potentiometer 153 in a plus or minus direction from its zero position. Either of these motions will introduce a signal into network 156 which will require a change in the roll output 138 of the vertical gyro. Again differentiator 158 provides a damping signal. For a step function change of voltage from either the rate of turn potentiometer 153 or the spring tension or compression transducer 152, the resulting exponential change in fuselage tilt 135, as measured by the vertical gyro 138, will be differentiated by means 158 to produce a voltage which, when combined with the output of vertical gyro 138, will be equal and opposite so that the output of network 156 remains substantially zero and position servo 148 will not move. Again a rate gyro could be substituted for differentiator 158 but the configuration as shown is less expensive and more reliable.

Thus the time-constant of differentiator 158 is adjusted to produce damping at least critical and even slightly greater than critical so that, if the air speed remains constant, for a step function in roll command, the fuselage tilt 135 will exponentially approach the commanded position without the necessity of appreciable motion of position servo output shaft 128. Thus for constant air speed the gains of the various components are adjusted such that the output of network 156 remains substantially zero; and the craft response closed loop is substantially the same as open loop were the system disconnected. Integrator 146 provides an infinite gain at zero frequency and permits of an exact positioning of output shaft 128 for the required changes in the cyclic control 131 with changes in the forward air speed of the draft. While in the pitch channel, integrator 26 improves the system response somewhat, it is not so important because of the fact that output shaft 8 does tend to operate about its zero position if the C.G. trim adjustment potentiometer 34 is properly set. But in the roll channel, integrator 146 is significantly more important because of the fact that output shaft 128 of position servo 148 will be required to operate from limit stop to limit stop to reposition the output shaft 125 of velocity servo 151 in accordance with changes in air speed and equalize the lift over the actuator disk.

In operation of the yaw channel in the stabilization mode, relay winding 160 is not energized; and relay contact 161 is closed. If the pilot is exerting no pressures on his stick 2 in roll and if the rate of turn adjustment potentiometer 153 is at its zero position and if the pilot is exerting no pressures on his rudder pedals 182, then switches 154, 155 and 207 will be closed, causing positive voltage 110 to energize relay winding 209, drawing the armature of switch 210 into engagement with the output of limiter 198. The craft is thus locked to a heading as determined by the flux-gate gyro compass 195. As shown and described in my copending application, the energization of winding 209 also renders the servomotor of the heading lock circuit 196 unresponsive to the output of the remote compass 195 so that the case-mounted pickoff turns with the craft and causes output signals to be produced in accordance with an error from the commanded heading. The case-mounted pickoff of the gyrocompass 195 may now be repositioned only by manually operating the spring-centered switch which connects terminal 193 to either of the positive and negative voltage sources 110 and 109 to command a change in heading. For a large change in position of the case-mounted pickoff, and hence a large change in the commanded heading, the craft will be forced to sneak to such heading in an uncoordinated skid, without roll or bank, at a predetermined rate of, for example, between one and three degrees per second. This predetermined rate of sneak to the desired heading is determined by the setting of maximum voltage permitted by limiter 198 and by the voltage proportionality constant of the rate of turn gyro 197. At the preset rate of sneak, the outputs of limiter 198 and rate of turn gyro 197 will be equal and opposite; and the output voltage of network 199 will be zero. As the error from the desired heading approaches zero, the craft rate of turn 192 will be forced to also approach zero so that at all times the output signal of the rate of turn gyro 197 is substantially equal and opposite to that of the limiter 198; and the output of network 199 remains substantially zero. Because there is no coupling to the roll channel, the turn is uncoordinated, being a skidding maneuver. Hence the rate of turn for large errors in heading must be limited to avoid undue structural stress, loss in forward speed, and passenger discomfort. It will be noted that in the yaw channel, as in the roll channel, in contradistinction to the pitch channel, transducer 205 provides a signal proportional only to the tension or compression in the pilot's feel centering spring 184 and not to the absolute position of the rudder pedals 182. It will be appreciated that there is no predetermined relationship between rate of turn and the absolute position of the pilot's rudder pedals 182. When the main rotor absorbs torque from the power plant, the tail rotor blade pitch 191 must be increased to compensate for this torque. When the main rotor is in autorotation, being air driven and receiving no torque from the power plant, then the tail blade rotor pitch 191 must be reduced to zero if the rate of turn is to be held at zero. Consequently, it is only during autorotation that the tail rotor blade pitch 191 and the craft rate of turn 192 bear a corresponding relationship. If large changes in power are occasioned, as to accommodate a climb or descent, then the craft will begin to turn, causing outputs from both rate gyro 197 and compass 195. This will produce an error signal from network 199. The output shaft 188 of position servo 202 will move towards one or the other of the two limit stops; but before the depending leg 203 reaches either limit stop, the movable contact of switch 204 will engage one or the other of the two fixed contacts and apply a signal to the movable contact of switch 204. Velocity servo 206 will be driven to reposition its output shaft 185 and, through spring 184, the pilot's rudder pedals 182 until the position servo output shaft 188 lies within the limits determined by the two fixed contacts of switch 204. The craft will return to the commanded heading where the output of compass 195 and rate gyro 197 return to zero. In the yaw channel integrator 200 is of importance since position servo 202 will be required to operate, not merely about its zero position, but from limit stop to limit stop. If no changes in power setting are required and the craft maintains constant altitude and constant air speed, then to accommodate a change in commanded heading from a signal at terminal 193, the output shaft of position servo 188 will be required to move from its initial position an amount proportional to the desired rate of sneak according to the setting on limiter 198 and will then, as the error signal from gyro compass 195 approaches zero, exponentially return to its initial position. The damping effect of the rate of turn gyro 197 prevents overshoot in the craft's approaching and retaining the commanded heading. The pilot can command a similar skidding or uncoordinated turn to a new heading by a movement of rudder pedals 182. If the pilot exerts pressure on rudder pedals 182, switch 207 will open, relay winding 209 will become de-energized, and the armature of switch 210 will disengage that contact connected to the output of limiter 198 and engage that contact connected to the ouput of network 208. Transducer 205 generates an output signal which is proportional to the pilot's pressure on rudder pedals 182 and which is impressed on network 208. One input to network 208 comprises the output of roll accelerometer 140. Since roll accelerometer is mounted on the fuselage, it provides a signal proportional to the amount of skid. Thus the craft will be forced into such rate of turn 192 that the resulting centrifugal force causes the output signal of accelerometer 140 to be equal and opposite to the output signal of transducer 205. The gains of components 140 and 205 should be adjusted such that for craft rates of turn commanded solely by movements of rudder pedals 182, the output of network 208 remains substantially zero and position servo 202 remains substantially stationary. This setting of gains will produce a closed loop response identical to the open loop response were the system disconnected. Since centrifugal force is equal to the product of rate of turn and air speed and since change in tail rotor blade pitch is substantially equal to the product of rate of turn and air speed, a setting for the gains of components 205 and 140 correct at one air speed will be correct for all air speeds in the flight regime except air speeds approaching zero. The rudder pedal feel centering spring 184 should preferably be fairly stiff. With the provision of a stiff centering spring 184 and an hydraulic damper 193, the pilot will feel considerable foot pressures in performing an uncoordinated or skidding turn so that undue craft stresses will not be set up without their realization by the pilot in the pedal forces he must exert. The de-energization of relay winding 209 also causes the servomotor of the heading lock 196 to reposition the case-mounted pickoff element of the flux-gate gyro compass 195 in accordance with its output error signal. Thus when the pilot removes foot pressure from the rudder pedals 182, switch 207 will close, causing winding 209 to pull armature 210 into engagement with the output of the remote compass 195, and disabling the servomotor in the heading lock 196 so that the craft will seek and maintain the new heading commanded by the pilot. Coordinated turns to a new heading may be accomplished through motion of either of two controls. Firstly, the pilot may move his cyclic stick 2 in roll. Secondly, the pilot may rotate his rate of turn adjustment potentiometer 153 from its zero position. The motion of either of these controls, as has been previously explained, will cause a fuselage tilt 135, accompanied by an output signal from roll accelerometer 140. If the pilot moves his cyclic stick 2, then switch 154 will open. If the pilot moves his rate of turn adjustment potentiometer 153, then switch 155 will open. In either event, winding 209 will become de-energized; and the armature of switch 210 will be rendered responsive to the output of network 208. One input to network 208 comprises the output signal of roll accelerometer 140. Since roll accelerometer 140 is mounted on the fuselage, it provides an output signal proportional to slip and skid and is, therefore, responsive to uncoordinated maneuvers. Thus the craft will be forced into such rate of turn 192 that the resulting centrifugal force causes the output of accelerometer 140 to return to zero. Because of the coupling of roll accelerometer 140 into the yaw channel, the resulting turn must be coordinated. Any slip or skid will cause an output signal from accelerometer 140 which will result in a change in tail rotor blade pitch 191 and a change in craft rate of turn 192 until the turn is precisely coordinated. Thus I may produce coordinated turns for all air speeds in the flight regime except air speeds approaching zero. Again the opening of either of switches 154 or 155 removes the disabling signal from the heading lock 196 permitting the case-mounted pickoff of the gyro compass 195 to be repositioned so that when the pilot releases pressure on the cyclic stick 2 or returns his rate of turn adjustment potentiometer 153 to zero closing switches 154 and 155, the craft will seek and maintain the heading which existed at such time. It will be noted that the coupling of the roll channel accelerometer into the yaw channel gives desirable characteristics for all air speeds except those approaching zero. For skidding turns commanded solely by movement of the rudder pedal 182, the response closed loop may be made identical to the response open loop by proper relative gain adjustments; and turns commanded by movement of either the roll cyclic stick 2 or the rate of turn potentiometer 153 will be precisely coordinated. But a problem arises as air speeds approach zero. At zero air speed the output of roll accelerometer 140 is not responsive to craft rate of turn, since no centrifugal force can be developed. Accordingly at zero air speed the yaw channel integrator 200 would tend to run away to saturation, because the system could not be nulled in response to movement of either the roll cyclic stick 2 or the turn potentiometer 153 or the rudder pedals 182. Hence some other craft motion feedback must be used which will be responsive to rate of turn at zero air speed. The output of the rate of turn gyro 197 is independent of airspeed and is accordingly coupled to network 208. In order that turns commanded by movements of either of the roll channel controls 2 and 153 remains coordinated, the roll output 138 of the vertical gyro or gyro horizon is also coupled to network 208. For the usual cruising air speeds of helicopters, the angle of bank for a coordinated standard rate 3° per second turn is approximately 15°. The gains of the components 138 and 197 are adjusted so that for a 15° bank and approximately a 3° per second rate of turn, equal and opposite voltages are coupled to network 208. Thus at the cruising air speed, the output of accelerometer 140 will be zero; and turns will be precisely coordinated. This adjustment for the gains of components 138 and 197 will be correct at only one air speed however. For air speeds above or below cruising, some slight skid or slip will be present. However, accelerometer 140, being responsive to such lack of coordination, will tend to reduce the error sufficiently that the average pilot will rarely feel the need to apply top or bottom rudder pressure to pedals 182. Thus rate gyro 197 enables the yaw channel to null at zero air speed where accelerometer 140 is ineffective; and the roll signal 138 of the gyro horizon compensates for the signal of rate gyro 138 so that precisely coordinated turns are automatically secured at least for cruising air speeds. With the introduction of the signal of the rate gyro 197 into network 208, the closed loop craft response for skidding turns commanded solely by movement of rudder pedals 182 will be identical to the open loop response at only one air speed. The gain adjustment of accelerometer 140 may be decreased or that of transducer 205 may be increased from the settings previously specified so that at cruising air speeds the output signal from transducer 205 is equal and opposite to the sum of the signals from accelerometer 140 and rate gyro 197; and position servo 202 remains stationary. For air speeds other than cruising, some slight difference will exist between open and closed loop craft response to movements of the rudder pedals 182. However, the average pilot will not be able to detect such slight differences in craft response. In some control systems, coordinated turns are commanded through the yaw channel; and the roll channel is forced to maintain the turn coordinated. In my hovering control system, for reasons described hereinafter, coordinated turns are commanded in the roll channel; and the yaw channel is forced to maintain the turn coordinated. It will be appreciated that regardless of the position of the armature of relay switch 210, the output of integrator 200 is always responsive to its input; and the system always finds a true null. This null cannot be defeated by any of the pilot's commands; and in seeking a null, the system forces the craft to follow the pilot's commands.

In operation of the collective channel in the stabilization mode, the output error signal of the barometric altimeter 67 is coupled through relay switches 81 and 84 to network 82 where it is compared with the output signal of the barometric rate of climb meter 65. If the pilot exerts no forces on his collective stick 52 and if the pilot's rate of climb adjustment potentiometer is at its zero position, then switches 78 and 79 will remain closed with the result that relay winding 83 will be energized and the armature of switch 84 will engage that contact connected to the armature of switch 81. The craft is thus locked to an altitude determined by the barometric altimeter 67. The positive signal applied to relay winding 83 also renders the servomotor of the altitude lock circuit 66 unresponsive to the output of altimeter 67 so that the case-mounted pickoff element of the barometric altimeter 67 remains stationary, causing output signals to be produced with error from commanded altitude. The case-mounted element of the barometric altimeter 67 may now be repositioned only by manually operating the spring-centered switch which applies positive or negative voltage to terminal 63 to command a change in altitude. For a large change in the error signal of the barometric altimeter 67, limiter 68 is set to a predetermined level so that a rate of climb will be produced which lies within the usual operating limits of the craft. For example, if the craft altitude is less than the command altitude, the collective blade pitch must be increased which, in turn, will require an increased engine output to maintain the speed of the rotor constant. It is usually not desirable, except under emergency conditions, to produce a rate of climb which would require a maximum engine output. Accordingly, the level of limiter 68 is adjusted so that regardless of how much craft altitude is below the command altitude, a rate of climb will be produced which will require an engine output certainly above normal cruising power, but appreciably less than the maximum power of which the engine is capable of developing. Similarly limiter 68 is set so that regardless of how high the craft is above its commanded altitude, the craft rate of descent will not exceed that which would accompany autorotation at the normal rotor speed. Limiter 68 is adjusted to produce predetermined rates of climb or descent, regardless of the actual error in altitude, between 300 and 1,000 feet per minute, for example. As the craft approaches the desired altitude and the output of limiter 68 decreases from either its maximum positive or negative value towards zero, the craft vertical velocity 62 will be forced to decrease so that at all times the outputs of the barometric rate of climb meter 65 and limiter 68 are equal and opposite and the output of network 82 remains substantially zero. The damping afforded by the barometric rate of climb meter 65 causes a deadbeat approach to and retention of the commanded altitude without overshoot or other instability. The pilot can command a predetermined rate of climb or descent in either of two ways. Firstly, the pilot may maintain a pressure on the collective stick 52, causing a tension or compression in feel centering spring 64 and an output from transducer 90. Secondly, the pilot may rotate his rate of climb adjustment potentiometer 74 to introduce either a positive or negative signal into network 75. In either event one of switches 78 and 79 will open, de-energizing winding 83 and permitting armature 84 to engage that contact connected to the output of network 75. A signal introduced into network 75 from rate of climb adjustment potentiometer 74 will force a change in vertical velocity 62, until an equal and opposite signal appears from the barometric rate of climb meter 65 so that the output signal of network 75 returns to zero and the output shaft 58 of position servo 71 will not be required to move further. The gains of components 90 and 65 should be adjusted such that for rates of climb and descent commanded solely by movement of collective lever 52 the output of network 75 remains substantially zero and position servo 71 remains substantially stationary. This setting of gains causes the closed loop craft response to the collective lever 52 to be identical to the open loop response were the system disconnected. The de-energization of winding 83 causes the servomotor of the altitude lock circuit 66 to reposition the case-mounted pickoff of the barometric altimeter 67 in correspondence with the position of the movable aneroid diaphragm responsive pickoff element. When the pilot releases pressure on the collective stick 52 or returns his rate of climb adjustment potentiometer 74 to the zero position, switches 78 and 79 will be closed, energizing winding 83, rendering the armature of contact 84 responsive to the barometric altimeter 67, and disabling the servomotor in the altitude lock circuit 66 so that the craft will seek and maintain the altitude existing at such time. It will be noted that in the collective channel, as in the roll and yaw channels, in contradistinction to the pitch channel, transducer 90 generates the signal proportional only to the tension or compression in spring 64 and not to the absolute position of the collective stick 52. In the collective channel there is no predetermined relationship between absolute position of the collective stick 52 and rate of climb. There is a certain helicopter air speed somewhere in the region between, for example, 20 and 40 knots that the power output and hence the blade pitch 61 required to maintain level flight is a minimum. For speeds greater than this the blade pitch 61 must be increased; and for speeds less than this, especially for hovering, the blade pitch 61 must be again increased. Furthermore, with changes in load from full gross weight down to a lightly loaded condition when gas tanks are nearly empty, the blade pitch will change even for constant air speed and altitude. Finally, with variation in air density the blade pitch 61 will be required to change. The position servo 71 is only of limited authority, and cannot alone accommodate the large changes in blade pitch 61 required throughout a complete flight regime. As the depending leg 73 of the output shaft 58 of position servo 71 approaches one of its two limit stops, the movable contact of switch 72 will first engage one of the two fixed contacts thereof, causing a signal to be applied to velocity servo 89. The velocity servo output shaft 55 moves at a certain rate and, through centering spring 54, repositions the pilot's collective stick 52, changing the collective blade pitch 61, until the position servo output shaft 58 is driven away from one of the two limit stops and operates within its region of authority. In the event of engine failure, it is absolutely essential that the blade pitch 61 be reduced sufficiently to permit the rotor to autorotate at a sufficient speed that the lifting blades will neither stall nor collapse upwardly due to decreased centrifugal force. All pilot's commands inconsistent with a reduction in blade pitch 61 must be ignored or overridden. If either through a loss in engine power or through a combination of commands from rate of climb adjustment potentiometer 74 and transducer 90, the blade pitch 61 is too high for the maximum available engine power, then the speed of main rotor will begin to decrease from its normal operating value. The output voltage of the rotor tachometer 76 will likewise decrease. Hysteresis circuit 77 is adjusted so that when the output voltage of tachometer 76 is less than a predetermined level, a signal will be coupled to network 82. This signal from hysteresis circuit 77 is applied with sufficient gain to substantially overpower any commands inconsistent with a reduction in blade pitch 61 which may appear at the armature of switch 84. The output signal of network 82 will now cause position servo 71 to reduce the blade pitch 61, causing rotor speed to increase until now the rotor tachometer 76 generates a voltage sufficient that the output of hysteresis circuit 77 drops substantially to zero. Hysteresis circuit 77 may be adjusted such that no output voltage is produced until rotor speed has been decreased 5 percent, for example, from the normal operating value. This tolerance of say 5 percent will yield an ample region in which the automatic engine power controls may operate to maintain rotor speed at its normal value and will then permit of immediate response to movements of the collective lever 52 without causing an emergency overriding signal from hysteresis circuit 77. Similarly, overspeeding of the main rotor must be avoided where the pilot commands either through transducer 90 or through rate of climb adjustment 74 an excessive rate of descent. It is usual to permit overspeeding of the main rotor up to, for example, 30 percent beyond its normal operating speed so that a margin of autorotative safety may be stored as kinetic energy to flair out the final touchdown. If the pilot commands a rate of descent which would require a higher rotor speed than say 30 percent above normal, then the increased voltage from rotor tachometer 76 will cause an output from hysteresis circuit 77 which will overpower any other input signal to network 82. Servomotor 71 will be driven to increase the collective blade pitch 61 so that the rotor will not exceed a predetermined speed of approximately 30 percent above normal. In the event of engine failure at high altitude the rate of climb adjustment potentiometer 74 may be set to accommodate the rate of descent associated with autorotation at the normal rotor operating speed. Thus the system will find a true null, since the output of hysteresis circuit 77 will be zero. Such setting of the rate of climb adjustment potentiometer 74 will achieve the maximum glide angle so that suitable landing fields will be within the gliding radius. During this period of glide the craft will be responsive to motions of the pilot's collective stick 52 to slightly increase or slightly decrease this rate of descent since the hysteresis 77 is not overpowering the pilot's commands. As the helicopter approaches the ground, at, for example, not less than several hundred feet, the rate of climb adjustment potentiometer 74 may be adjusted to its maximum rate of descent setting. This setting is such that the rate of descent will be accompanied by a main rotor speed of substantially 30 percent above normal to accommodate a margin of autorotative safety. On approaching the ground the pilot may flair out his touchdown by exerting an upward force on the collective stick 52, utilizing the kinetic energy stored in the rotor blades as they slow down from 30 percent above normal to 5 percent below normal operating speed. During this autorotative landing operation the hysteresis circuit 77 will be operating within its region of zero output and the pilot will have complete control over the blade pitch 61 through his collective stick 52. It will be appreciated that at all times integrator 69 is within the system and its input is always responsive to its output so that the integrator cannot run away to saturation.

In the stabilization mode of the pitch channel, position servo 28 is always operating substantially about its zero position and even its limited authority is sufficient to completely stabilize the craft for all pitch commands if the center of gravity trim is correct. Because of the substantially linear relationship between the absolute position of stick 2 and the resultant pitch signal 18 of the gyro horizon, I may measure the absolute position of the cyclic stick 2 by means of transducer 30. Velocity servo 31 serves to set the cyclic stick 2 in a certain absolute pitch position without the necessity of maintaining control pressures in order to secure a certain fuselage tilt 15 and hence substantially a certain air speed. However, in the roll, yaw, and collective channels, no such proportional relationship exists as for the pitch channel; and hence I measure only the motion of a pilot's control relative to the output shaft of the associated velocity servo. A position servo provides proportional control for the associated channel, but only within a region of limited authority. If a position servo approaches one of its limit stops, a signal of an appropriate polarity is applied to the associated velocity servo to reposition the pilot's control until the position servo is operating within its limited region. Thus for the roll, yaw, and collective channels the system combines an on-off contactor-type velocity servo with a proportional servo to secure the advantages of each.

In order for my automatic control system to operate in the hovering mode, the aircraft must first be brought to substantially a hover with an absolute ground speed of, for example, less than five knots so that the sonar dome will not be damaged. My copending application shows the use of Doppler radar to bring a craft to a hover over the terrain below. The sonar dome may now be lowered on the cable into the water. In order to avoid damage to the dome, the cable must be payed out rapidly as soon as the passage of a wave crest has been detected either by the Doppler vertical velocity meter or by the radio altimeter or by the radio altimeter differentiator. By rapidly lowering the dome upon the passage of a wave crest, the dome will be dropped into the trough of a wave and will not be struck by the succeeding wave crest while in mid-air. Upon submergence of the dome to a predetermined depth of, for example, one foot, manometric depth indicator 98 will close switch 99. Positive voltage from terminal 110 will now be applied to stand-by terminal 111.

In operation of my automatic control system in the hovering mode, pitch hover switch 43 is closed; and the pitch attitude 15 of the craft is no longer governed by the vertical gyro 18 but is instead governed by ground speed relative to the ocean below. It will be appreciated that in the combined use both of my instant invention and of my copending application, the control system would be first switched from the stabilization mode to the Doppler approach-to-hover mode and then switched from the Doppler approach-to-hover mode to the sonar dome hovering mode. In the instant invention I have shown only switching from the stabilization mode to the sonar dome hovering mode, for ease of description. It will be appreciated that in the stabilization mode of the instant invention, zero ground speed may still be achieved manually if the pilot is provided with means, such as Doppler radar, for determining ground speed. The closing of switch 43 now energizes relay actuating winding 40, drawing the armature of switch 41 into engagement with that contact which is connected to the movable contact of switch 29 and drawing the armature of switch 42 to engagement with that contact connected to the output of network 36. In the hovering mode of the pitch channel, the output of the cable sensor network 44 is compared with the outputs of transducer 32 and velocity adjustment potentiometer 33. If the pilot exerts no pressures on his cyclic control stick 2 and if the velocity adjustment potentiometer 38 is positioned for zero output voltage, then position servo 28 will move the cyclic control 11 until the output of network 44 is zero. In the hovering mode there is no longer a proportional relationship between absolute stick position and ground speed, since absolute stick position is proportional only to air speed. Accordingly in the hovering mode the absolute stick position transducer 30 is rendered ineffective to control the craft; and relative stick position transducer 32, which measures tension or compression in feel centering spring 4, is rendered operative. Also position servo 28 may be required to exceed its limited authority; and hence velocity servo 31 is no longer responsive to the pilot's beeper switch 35 but is instead rendered responsive to the output of limit stop switch 29 in order to automatically reposition the pitch cyclic stick 2 in the hovering mode. The output of cable sensor 50, mounted on the fuselage, contains linear terms proportional to craft acceleration 25 and to fuselage tilt 15 and a square-law term representative of craft velocity 24. The outputs of accelerometer network 21 and vertical gyro 18 are applied to network 44a in order to compensate for these linear terms. The output of network 44a is thus proportional only to the square of craft velocity 24. The output of square-root circuit 44b is proportional to craft velocity 24. The output of accelerometer network 21 is coupled to network 44 to damp the system response. It will be seen that the output of accelerometer network 21 is used not only to correct for acceleration errors in cable sensor 50 but also to obtain system damping. The gains of square-root circuit 44b and accelerometer network 21 are adjusted such that identical closed and open loop craft responses will result from commands introduced solely by movement of the pitch stick 2. This adjustment in system damping afforded by accelerometer 20 is slightly greater than critical so that the commanded velocity is approached exponentially dead-beat without overshoot. If the craft is hovering at zero fore-and-aft ground speed with no wind, the cyclic stick 2 will be in its neutral position since the airspeed of the craft is zero. If a wind now arises and the heading of the craft is maintained into the wind (as is described in detail in the following paragraph), then the craft will drift backwardly. Cable sensor network 44 will produce an error signal; and the position servo output shaft 8 will move towards one limit stop. If the wind velocity is sufficiently great, the movable contact of switch 29 will engage one of the two fixed contacts thereof, causing a signal to be coupled through switch 41 to the velocity servo 31. The pilot's stick 2 will thus be moved forwardly until the position servo output shaft 8 is driven from the limit stop an amount sufficient that the movable contact of switch 29 engages neither fixed contact. The craft air speed will be increased until equal to the wind velocity; and both the ground speed and the output of cable sensor network 44 return to zero. Thus in the hovering mode of the pitch channel the interconnection between the position servo limit stop switch 29 and the velocity servo 31 is the same as for the roll, yaw, and collective channels in the stabilization mode. Since in the hovering mode the pilot's stick 2 is automatically repositioned in pitch by the velocity servo 31, the manual beeper switch 35 is rendered inoperative. In the hovering mode of the pitch channel, integrator 26 assumes increased importance, since position servo 28 will not operate merely about its zero position but will instead be required to operate from limit stop to limit stop.

In operation of the roll and yaw channels in the hovering mode, switch 163 is closed to energize relay actuating winding 60, which opens switch 161 and causes the armature of switch 162 to be responsive to the output of network 165. The opening of relay switch 161 de-energizes relay winding 209, permitting the armature of switch 210 to be responsive to the output of network 208. Thus when the dome is submerged and both standby switch 99 and switch 163 are closed, the yaw channel is rendered responsive to accelerometer 140 and to the roll pickoff 138 of the gyro horizon; and the roll channel is rendered responsive to cable sensor 170. If no pressures are exerted on the pilot's cyclic stick and if the left-right velocity adjustment potentiometer 153 is positioned for zero output voltage, then position servo 148 will cause motions of the cyclic control 131 until the output of network 165 is zero. It will be noted that the condition of zero output from network 165 may be accommodated with the craft broadside to the wind while maintaining zero ground speed, but only by a rotor tilt 132 into the wind and a fuselage tilt 135 into the wind with corresponding outputs from both the roll pickoff 138 of the vertical gyro and accelerometer 140. To maintain zero ground speed with the craft headed other than into the wind is an uncoordinated maneuver which will occasion an output from the skid-slip accelerometer 140. The output signals from both accelerometer 140 and vertical gyro 138 command a rate of turn in the yaw channel such that the output signal of the rate of turn gyro 197 is equal and opposite to their sum. Initially the rate of turn 192 and the output of rate gyro 197 are zero. However, the output signal from network 208 in response to the signals from vertical gyro 138 and accelerometer 140 causes position servo 202 to vary the blade pitch 191 until the resulting craft rate of turn 192 and the corresponding output of rate gyro 197 are sufficient that the output of network 199 returns to zero. Thus the craft gradually turns into the wind until the output signals of the vertical gyro 138 and accelerometer 140 and the rate of turn gyro 197 are all zero. Of course during this process of turning into the wind at a rate proportional to the fuselage tilt 135, as measured by components 140 and 138, the pitch channel will be simultaneously increasing the forward velocity and the roll channel will be simultaneously decreasing the lateral athwartship velocity so that the entire correction for wind is supplied by the pitch channel rather than by the roll channel. During the gradual turn into the wind, the craft will begin to drift backwardly and to that side towards which the fuselage is tilted. However, this will produce outputs from cable sensor networks 44 and 165. These outputs move position servos 28 and 148, respectively, until the longitudinal drift, as indicated by network 44, and the athwartship drift, as indicated by network 165, return to zero. It would obviously be inefficient, if not impractical, to force the craft to fly broadside into the wind at, for example, 40 knots to maintain zero ground speed. The coupling of the roll channel components 140 and 138 into network 208 of the yaw channel automatically insures a hover with the craft headed into the wind. If the pilot applies pressures to his rudder pedals 182, the craft will yaw out of the wind; and a portion of the wind correction must now be supplied through the roll channel, resulting in output signals from both vertical gyro 138 and accelerometer 140 due to the resulting fuselage tilt 135. The ground speed will remain zero; and the fuselage tilt 135 will be such that the sum of output signals from components 138 and 140 is equal and opposite to that of transducer 205. Since the ground speed of the craft is substantially zero, such maneuver is uncoordinated; and lateral forces will be felt by the pilot proportional to the amount of pressure exerted on rudder pedals 182 in precisely the same manner as if the pilot were performing an uncoordinated skidding or sliping turn at crusing speed. Because of the stiffness of spring 184 and because of the provision of dashpot damper 193, the pilot will appreciate these undesirable lateral forces by the pedal pressures required to produce them. In the hovering mode of the roll channel, inertial damping is again secured from the output of accelerometer network 141. The square-root circuit 165b is responsive to a linear combination of signals from cable sensor 170, network 141, and vertical gyro 138. The gains are adjusted such that the square-root circuit 165b receives an input signal proportional only to the square of dome velocity and independent of fuselage tilt and dome acceleration or craft acceleration. The output of the square-root circuit 165b is thus linearly proportional to dome velocity and independent of fuselage tilt and dome acceleration. The output of the square-root circuit 165b is linearly combined with the output of network 141 so that the output of network 165 comprises a term linearly proportional to dome velocity and a damping term linearly proportional to craft acceleration. The gains of network 141 and of the square-root circuit 165b are adjusted such that for a step function change in commanded left-right velocity solely by motion of the roll cyclic stick 2, the output voltage of network 165 is equal and opposite to that produced by transducer 152 and position servo 148 will remain stationary. Identical closed and open loop responses will result; and the pilot will be equally at ease under instrument flight as under visual flight conditions. The pilot may also produce a velocity to the left or right by moving his velocity adjustment potentiometer 153 from its zero position. This will again result in a voltage being introduced into network 156 which will, now through a movement of position servo 148, force a motion of the cyclic control 131 until the output voltage of network 165 supplies an equal and opposite voltage so that the output of network 156 returns to zero. At the same time the required craft acceleration and fuselage tilt to produce this lateral velocity causes a rate of turn to be developed in the yaw channel so that the craft heads into the new resultant wind. This in turn causes a slight correction in the pitch channel for the added quadrature component of velocity. When the pilot returns his velocity adjustment potentiometer 153 to its zero position, the lateral drifting motion will cease, accompanied by corrections in both the yaw and pitch channels to, respectively, head the craft into the true wind and maintain the airspeed of the craft precisely at the wind velocity so that the ground speed is zero.

In operation of the collective channel in the hovering mode, switch 88 is closed, energizing relay actuating winding 80 and drawing the armature of switch 81 into engagement with that contact which is connected to the output of limiter 96. Thus if the pilot exerts no pressures on his collective stick 52 and permits his rate of climb adjustment potentiometer 74 to remain at its zero position, then the armature of switch 84 is also responsive to the output of limiter 96. The altitude adjustment potentiometer 94 is set to that altitude which it is desired the craft maintain. At such altitude the output signal of network 95 is zero. Again the output of the barometric rate of climb meter 65 is combined in network 82 with the altitude error signal of network 95 to provide damping so that the craft approaches the desired altitude dead-beat without overshoot.

For hovering operation over the ocean, however, the manometric depth indicator 98 is responsive to wave motions as well. If the craft is maintaining a constant altitude which is equal to the setting of the altimeter adjustment potentiometer 94, the output of network 95 will alternatingly rise above and below zero due to the response of depth indicator 98 to the crests and troughs of the waves below. The craft will tend to respond to the motion of the ocean waves, moving up and down, in order that the distance from the craft to the ocean surface remain constant. Since the frequency involved in wave motion is so low, it would indeed be difficult to filter the output of network 95 sufficiently that the craft would maintain a constant absolute altitude without causing the craft response to be too sluggish to changes in commanded altitude by adjustment of potentiometer 94. Furthermore, the frequency of ocean waves varies considerably. Limiter 96 restricts the maximum error signal produced at the output of network 95. It will be recalled that the restriction afforded by barometric altimeter limiter 68 is selected with regard to engine power primarily and to passenger comfort secondarily. However, the restriction afforded by limiter 96 is selected with regard to avoiding undue changes in absolute altitude caused by wave motion while at the same time permitting sufficient rates of climb and descent to achieve the commanded altitude without excessive delay. There is a further consideration in that rates of descent must be restricted to less than the sinking speed of the sonar dome when the cable supports none of its weight. Furthermore, although it is desirable to rapidly lower the dome into the water, the rates at which the cable is subsequently payed out must be limited to less than the free sinking speed of the dome. Accordingly, to increase the free sinking speed, the dome should have a much higher specific gravity than sea water; and the dome should be of streamlined, tear-drop shape similar to a bomb to minimize water drag. It will be appreciated that if, either by excessive craft rate of descent or by excessive speed in paying out cable, the cable becomes slack, then the craft will descend below the commanded altitude and be driven into the ocean. It is therefore essential that limiter 96 be set to restrict craft rates of descent to less than the free sinking speed of the sonar bomb. Such setting of limiter 96 would severely restrict vertical motions of the craft due to wave action but would give a moderate speed of response in achieving approximately the desired average altitude. The pilot may override network 95 by moving either the collective stick 52 or the rate of climb potentiometer 74. Either of these motions results in the opening of one of switches 78 and 79, causing relay winding 83 to become deenergized, and permitting the armature of switch 84 to be responsive to the output of network 75. The collective blade pitch 61 will be altered until the craft climbs or descends at a rate such that the output signal of the barometric rate of climb meter 65 is equal and opposite to the voltage introduced from either transducer 90 or potentiometer 74 into network 75. If the pilot releases pressure on the collective lever 52 or returns his rate of climb potentiometer 74 to its zero position, then switches 78 and 79 will be closed, energizing winding 83, and causing the armature of switch 84 to be again responsive to network 95. If, either by pulling in the cable or by causing the craft to rise, the sonar dome is pulled out of the water, then stand-by switch 99 will open, removing voltage from terminal 111, and causing the control system to be switched from the sonar dome hovering mode back to the stabilization mode. The automatic switching to the stabilization mode upon removal of the dome from the water causes the craft to maintain an approximate hover over the same point, since the value of pitch and corresponding forward air speed necessary to compensate approximately for wind is stored in the absolute stick position transducer 30. Upon the automatic switching to the stabilization mode, transducer 30 is rendered effective; and compass 195 maintains the heading. If wind velocity and direction remain constant, then the craft will not drift appreciably from the point where the sonar dome is withdrawn from the water.

As will be appreciated by those skilled in the art, the equivalent circuit of each channel comprises a closed loop system containing many serially connected components which act as low-pass filters. In each channel corner frequencies exist for the position servo and the hydraulic servo. In each of the pitch and roll channels there are corner frequencies in the response of rotor tilt to movements of the cyclic control. In the collective and yaw channels there are corner frequencies in the response of craft vertical velocity and rate of turn, respectively, to changes in blade pitch. Furthermore, in the collective channel, altitude is inherently the integral of vertical velocity; and in the yaw channel, heading is inherently the integral of rate of turn. Each of these serially connected low-pass filters of the equivalent circuit of a channel introduces a phase shift approaching 90 degrees with frequencies greater than its corner frequency. As is well known by those skilled in the art, the corner frequency of a minimum phase shift, low-pass filter is that frequency where output lags input by 45° and where attenuation of zero-frequency response is 3 db. The gain of a channel cannot be increased indefinitely without causing instability due to phase shifts of 180 degrees being reached before the open loop gain has dropped below unity. It is essential for fast response that phase shifts be held to a minimum; and this is the reason for providing position follow-up devices for servos 28, 74, 148, and 202 in order to convert them from integrating velocity servos into position servos. Furthermore, none of the integrators 26, 69, 146, and 200 are serially connected in the closed loop of a channel. Rather, each integrator is connected in parallel so that each position servo is responsive not only to the integral of the difference signal but also to the difference signal itself. It will be appreciated that to serially connect an integrator would introduce an undesirable phase lag of 90 degrees. By integrating a difference signal and combining through an electrical network the integrated difference signal with the difference signal itself, I may provide infinite system gain at zero frequency and yet maintain system stability at frequencies where phase shifts of 180 degrees have been developed.

Referring now to FIGURE 3, which shows a preferred form of the pitch channel of my hovering control, the pitch output 18 of the vertical gyro is connected to the input of a lead circuit indicated generally by the reference character 38a. Lead circuit 38a may be similar to differentiator 38 except that lead circuit 38a also comprises a feedback capacitor shunting the feedback resistor. The output of transducer 30 and of the vertical gyro 18 and of lead circuit 38a are combined in a network 37a. The outputs of accelerometer 20 and vertical gyro 18 are again combined in a network 21 such that the output thereof is independent of fuselage tilt and proportional only to horizontal craft acceleration. The purpose of introducing the pitch output 18 of the vertical gyro into network 21 is to compensate for the pitch error produced by accelerometer 20 when the fuselage pitch is not zero. The output of network 21 is connected to the input of a lag circuit indicated generally by the reference character 26a. Lag circuit 26a is similar to integrator 26 except that lag circuit 26a also comprises a feedback resistor shunting the feedback capacitor. The output of cable sensor 50 and of accelerometer network 21 and of vertical gyro 18 are combined in a network 44a such that the output thereof is proportional to the square of craft velocity and independent of craft acceleration and fuselage tilt. The purpose of introducing the true fore-and-aft craft acceleration from network 21 into network 44a is to compensate for the acceleration error produced by cable sensor 50 when the longitudinal craft acceleration is not zero. It will be understood that if desired, switch 21a may be opened; and the output of network 21 will not be coupled into network 44a. The output of network 44a is connected to the input of a nonlinear circuit 44b providing a square-root function, a sine function, or other desired nonlinear output. Square-root circuit 44b is connected to the input of integrator 26. The outputs of square-root circuit 44b and of lag network 26a and of integrator 26 are combined in a network 27a. The output of network 27a is connected to the input of a deadband, hysteresis, or backlash circuit indicated generally by the reference character 29a. The output of deadband circuit 29a remains zero until the output of network 27a exceeds a predetermined positive or negative level as determined by the battery voltages of deadband circuit 29a. When the output of network 27a exceeds this level, then one of the diodes of deadband circuit 29a will conduct to provide an output voltage which follows input voltage. The output of deadband or backlash circuit 29a is impressed upon the velocity servo 31 and is also connected to the input of integrator 26. The output of network 27a is connected through a normally open relay switch, indicated generally by the reference character 41a, to one input of a network 39a. The other two inputs to network 39a comprise the output of network 37a and the output of the center of gravity trim adjustment potentiometer 34. The output of network 39a is impressed upon position servo 28. The output of integrator 26 is connected to its input through a normally closed relay switch indicated generally by the reference character 42a. It will be appreciated that, if desired, the input of integrator 26 may instead be connected through switch 42a to the output of network 27a by operating switch 26b.

In operation of the preferred form of the pitch channel shown in FIGURE 3, position servo 28 both in the hovering mode and in the stabilization mode is responsive not only to the attitude signal provided by vertical gyro 18 but also to the rate of change of attitude signal provided by lead circuit 38a. In the stabilization mode the normally closed relay switch 42a shorts out integrator 26, connecting its output directly to its input so that integrator 26 cannot run away to saturation; and normally open switch 41a prevents cable sensor 50 from affecting the commanded attitude of the craft. In the hovering mode, with switch 41a closed, the output of network 27a, which contains cable angle information, is impressed upon network 39a; and with switch 42a open, integrator 26 is no longer short-circuited. If the output of network 27a exceeds a predetermined level, then backlash circuit 29a will provide an output signal which is coupled through one of the crystals both to velocity servo 31 and to the input of integrator 26. This limiting action prevents integrator 26 from running away to saturation and causes velocity servo 31 to reposition, through spring 4, the pilot's cyclic stick 2 until the output signal of network 27 returns to the limited region defined by circuit 29a. It will be noted that the three inputs to network 27a comprise a signal proportional to ground speed, a signal proportional to the integral of ground speed, and a lagged acceleration signal. The lagged accelerometer signal par-takes of the nature of an inertially computed velocity signal. The rate of change of attitude signal provided by lead circuit 38a is also indicative of craft translational acceleration fore-and-aft in a horizontal plane. It will be noted that position servo 28 is always responsive to the craft attitude signal appearing at the output of network 37a. In the hovering mode backlash circuit 29a provides a signal to the input of integrator 26 which simultaneously prevents the output of network 27a from exceeding a certain level and causes velocity servo 31 to reposition the pilot's stick 2. It is only in the stabilization mode that integrator 26 is substantially short-circuited to prevent its running away.

Referring now to the preferred form of the roll channel shown in FIGURE 4, the roll output 138 of the vertical gyro is connected to the input of a lead circuit indicated generally by the reference character 158a. Lead circuit 158a is similar to differentiator 158 except for the additional provision of a feedback capacitor shunting the feedback resistor. The outputs of vertical gyro 138 and of lead circuit 158a are combined in a network 159a with the output of transducer 152. Again the outputs of vertical gyro 138 and of accelerometer 140 are combined in network 141 to produce a signal independent of fuselage tilt. The output of network 141 is connected to the input of a lag circuit indicated generally by the reference character 146a. Lag circuit 146a is similar to integrator 146 but further comprises a feedback capacitor shunting the feedback resistor. The output of cable sensor 170 and of accelerometer network 141 and vertical gyro 138 are combined in a network 165a such that the output thereof is proportional only to the square of craft velocity and independent of fuselage tilt and craft acceleration. It will be understood that, if desired, I may omit the coupling of the output of network 141 into network 165a by opening switch 141a. The output of network 165a is connected to the input of a nonlinear circuit 165b which provides a square-root function, a sine function, or other desired nonlinear output. The output of square-root circuit 165b is connected to the input of integrator 146. The outputs of square-root circuit 165b and of lag circuit 146a and of integrator 146 are combined in a network 147a. The output of network 147a is connected to the input of a hysteresis, deadband, or backlash circuit 149a which is identical in construction to deadband circuit 29a. The output of deadband or hysteresis circuit 149a is connected both to velocity servo 151 and to the input of integrator 146. Mode selection is accommodated by a normally open relay switch and a normally closed relay switch indicated generally by the reference characters 161a and 162a, respectively. Normally closed relay switch 162a connects the output of integrator 146 to its input. If desired, the input of integrator 146 may be connected through switch 162a to the output of network 147a by operating switch 146b. The output of network 147a is connected through normally open relay switch 161a to one input of a network 156a. The other input of network 156a comprises the output of network 159a. The output of network 156a is impressed upon position servo 148.

The operation of the preferred form of the roll channel of my hovering control shown in FIGURE 4 is similar to the operation of the preferred form of the pitch channel shown in FIGURE 3. In the stabilization mode, integrator 146 is short-circuited and cannot run away. In the hovering mode, position servo 148 is rendered responsive to the output of network 147a which contains cable angle information. In both the stabilization and hovering modes, position servo 148 is responsive to the attitude signal provided by the vertical gyro 138 and to the signal representing rate of change of attitude provided by lead circuit 158a. The lagged acceleration signal provided at the output of lag network 146a represents an inertially computed velocity signal. The leaded vertical gyro signal at the output of circuit 158a is also indicative of craft left-right translational acceleration in a horizontal plane. If the output of network 147a exceeds predetermined limits, backlash circuit 149a provides a signal which both prevents integrator 146 from running away and also causes velocity servo 151 to reposition the pilot's stick 2 until the output of network 147a lies within such predetermined limits.

It will be seen that I have accomplished the objects of my invention.

My automatic hovering control system is always responsive to and never opposes pilot commands. My hovering control system produces craft responses identical to those which would result were the system disconnected; and the pilot will be equally at ease under instrument flight as under visual flight conditions. My hovering control system is provided with integrators which provide infinite gain at zero frequency and reduce the steady state error to zero. In my hovering control system the input of each integrator, regardless of pilot commands, is always responsive to its output; and no integrator can run away to saturation. My hovering control system is operative through the complete flight regime without the necessity for readjustment by the pilot. My hovering control system will maintain a helicopter motionless at a hover headed into the wind at a predetermined altitude.

It will be understood that certain features and subcombinations are of utility and may be employed without reference to other features and subcombinations. This is contemplated by and is within the scope of my claims without departing from the spirit of my invention. It is, therefore, to be understood that my invention is not to be limited to the specific details shown and described.

Having thus described my invention, what I claim is:

1. A hovering control system for an aircraft having a roll axis and a pitch axis including in combination a manually operable member, means responsive to the position of the member for generating a first signal, a servo motor, means responsive both to movement of the member and to movement of the servo motor for controlling motion of the aircraft about one of the pitch and roll axes, an object, means including a cable for suspending the object from the aircraft, means responsive to angular movement of the cable about said axis for generating a second signal, and means responsive to the first and second signals for controlling the servo motor.

2. A hovering control system for an aircraft having a roll axis and a pitch axis including in combination an object, means including a cable for suspending the object from the aircraft, means mounted on the aircraft and responsive to angular movement of the cable about a first one of the pitch and roll axes for generating a first signal, an accelerometer providing a second signal, the accelerometer being mounted on the aircraft and having a sensitive element disposed for movement along the other axis, a stable platform mounted on the aircraft, means responsive to relative motion between the platform and the aircraft about the first axis for providing a third signal, and means responsive to the first and to the second and to the third signals for controlling aircraft motion about said first axis.

3. A hovering control system for an aircraft having a roll axis and a pitch axis including in combination a manually operable member, a servomotor, means responsive both to movement of the member and to movement of the servomotor for controlling motion of the aircraft about one of the pitch and roll axes, a weighted object, means including a cable for suspending the weighted object from the aircraft, means mounted on the aircraft and responsive to angular movement of the cable about said axis for generating a first signal, a stable platform mounted on the aircraft, means responsive to relative motion between the platform and the aircraft about the first axis for providing a second signal, means responsive to the position of the member for generating a third signal, and means responsive to the first and second and third signals for controlling the servomotor.

4. A hovering control system for an aircraft having a roll axis and a pitch axis including in combination an object, means including a cable for suspending the object from the aircraft, means responsive to angular movement of the cable about a first one of the pitch and roll axes for generating a first signal, means including an accelerometer for providing a second signal representative of the horizontal component of aircraft acceleration along the other axis, and means responsive to the first and second signals for controlling aircraft motion about said first axis.

5. A hovering control system for an aircraft operating over water, the aircraft having a roll axis and a pitch axis, including in combination an object having a specific gravity greater than that of the water, means including a cable for suspending the object from the aircraft into the water, means linearly responsive to angular movement of the cable about one of the pitch and roll axes for generating a first signal, a square-root circuit responsive to the first signal and providing an output signal, and means responsive to the output signal for controlling aircraft motion about said axis.

6. A hovering control system for an aircraft operating over water, the aircraft having a roll axis and a pitch axis, including in combination an object having a density greater than that of the water, means including a cable for suspending the object from the aircraft into the water, means responsive to angular movement of the cable about a first one of the roll and pitch axes for generating a first signal, means including an accelerometer for providing a second signal representative of the horizontal component of aircraft acceleration along the other axis, a square-root circuit responsive to both the first and second signals and providing an output, and means responsive to the output of the square-root circuit for controlling aircraft motion about said first axis.

7. A hovering control system for an aircraft operating over water, the aircraft having a roll axis and a pitch axis, including in combination an object having a specific gravity greater than that of the water, means including a cable for suspending the object from the aircraft into the water, means including nonlinear means responsive to angular movement of the cable about a first one of the pitch and roll axes for generating a first signal varying linearly as a function of the horizontal component of aircraft velocity relative to the water along the other axis, means including an accelerometer for providing a second signal representation of the horizontal component of aircraft acceleration along said other axis, and means responsive to the first and second signals for controlling aircraft motion about said first axis.

8. A hovering control system for an aircraft operating over water, the aircraft having a roll axis and a pitch axis, including in combination an object having a density greater than that of the water, means including a cable for suspending the object from the aircraft into the water, means responsive to angular movement of the cable about a first one of the roll and pitch axes for generating a first signal, means including an accelerometer for providing a second signal and a third signal each representative of the horizontal component of aircraft acceleration along the other axis, a square-root circuit responsive to the first and second signals and providing an output signal, and means responsive to the third signal and the output signal for controlling aircraft motion about said first axis.

9. A hovering control for an aircraft having a longitudinal heading axis and a pitch axis including in combination means for controlling the aircraft in pitch, an object, means including a cable for suspending the object from the aircraft, means responsive to angular movements of the cable about the pitch axis for generating a first signal representative of the fore-and-aft motion of the aircraft, means responsive to angular movements of the cable about the longitudinal axis for providing a second signal representative of the left-right motion of the aircraft, means rendering the pitch control means responsive to the first signal, means responsive to the second signal for rolling the aircraft about its longitudinal axis while maintaining a substantially constant aircraft heading to produce a side-slip, and means responsive to a persistent slip to one side for gradually changing the aircraft heading in a direction to reduce the average side-slip towards zero.

10. A hovering control system for an aircraft having a longitudinal heading axis and an athwartship axis including in combination an object, means including a cable for suspending the object from the aircraft, means responsive to angular movements of the cable about the longitudinal axis for providing a command signal, representative of athwartship motion of the aircraft, means responsive to the command signal for rolling the aircraft about its longitudinal axis while maintaining a substantially constant aircraft heading to produce a side-slip, and means responsive to a persistent slip to one side for gradually changing the aircraft heading in a direction to reduce the average side-slip towards zero.

11. A hovering control system for an aircraft operating over water including in combination an object having a specific gravity greater than that of the water and provided with a hydrostatic pressure transducer producing a first signal, means including a cable for suspending the object from the aircraft into the water, means responsive to cable length for producing a second signal, and means responsive to the first and second signals for controlling aircraft altitude.

12. A hovering control system for an aircraft operating over water including in combination an object having a density greater than that of the water and provided with a hydrostatic pressure transducer producing a first signal, means including an elongated member for suspending the object from the aircraft into the water, means responsive to the length of the member for producing a second signal, means combining the first and second signals to produce a resultant signal means for limiting the resultant signal, and means responsive to the limited resultant signal for controlling aircraft altitude.

13. A hovering control system for an aircraft operating over water including in combination an object having a density greater than that of the water and provided with a hydrostatic pressure transducer, a switch responsive to the hydrostatic pressure transducer and having a first state when hydrostatic pressure is greater than a predetermined value and having a second state when hydrostatic pressure is less than such value, means including an elongated member for suspending the object from the aircraft, first means responsive to angular movements of the member for controlling horizontal motion of the aircraft, second means for controlling horizontal motion of the aircraft, means responsive to the first state of the switch for rendering horizontal aircraft motion responsive to the first means, and means responsive to the second state of the switch for rendering horizontal aircraft motion responsive to the second means.

14. A hovering control system for an aircraft operating over water including in combination an object having a density greater than that of the water and provided with a hydrostatic pressure transducer producing a first signal, means including an elongated member for suspending the object from the aircraft into the water, a limiter responsive to the first signal and providing a second signal, means providing a third signal representative of aircraft vertical velocity, and means responsive to the second and third signals for controlling aircraft altitude.

References Cited in the file of this patent

UNITED STATES PATENTS

| | | |
|---|---|---|
| 1,919,089 | Breguet et al. | July 18, 1933 |
| 2,650,046 | Vanderlip | Aug. 25, 1953 |
| 2,733,878 | Ciscel | Feb. 7, 1956 |
| 2,873,075 | Mooers et al. | Feb. 10, 1959 |